US012736129B2

(12) United States Patent
Kotloski

(10) Patent No.: US 12,736,129 B2
(45) Date of Patent: Sep. 15, 2026

(54) ELECTRIC MOTOR GEARBOX WITH INTEGRATED BRAKE

(71) Applicant: Oshkosh Defense, LLC, Oshkosh, WI (US)

(72) Inventor: Andrew Kotloski, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

(21) Appl. No.: 18/660,456

(22) Filed: May 10, 2024

(65) Prior Publication Data

US 2024/0375731 A1 Nov. 14, 2024

Related U.S. Application Data

(60) Provisional application No. 63/466,093, filed on May 12, 2023, provisional application No. 63/466,120, filed on May 12, 2023.

(51) Int. Cl.
*F16H 63/36* (2006.01)
*B60T 13/22* (2006.01)
(Continued)

(52) U.S. Cl.
CPC .............. *F16H 61/30* (2013.01); *B60T 13/22* (2013.01); *B62D 55/06* (2013.01); *B62D 55/125* (2013.01);
(Continued)

(58) Field of Classification Search
CPC ...... F16H 2200/201; F16H 2200/2007; H02K 7/102
See application file for complete search history.

(56) References Cited

U.S. PATENT DOCUMENTS 5,330,034 A 7/1994 Rancourt et al.
6,830,526 B2 12/2004 Stettler
(Continued)

FOREIGN PATENT DOCUMENTS

CN 201779083 U 3/2011
CN 109099131 A * 12/2018
(Continued)

OTHER PUBLICATIONS

International Search Report and Written Opinion issued in connection with PCT/US2024/028753 dated Mar. 4, 2025.
(Continued)

*Primary Examiner* — Stacey A Fluhart
(74) *Attorney, Agent, or Firm* — Foley & Lardner LLP

(57) ABSTRACT

An electric drive train for a military vehicle includes an electric motor, and a gearbox. The gearbox is driven by the electric motor and drives a tractive element. The gearbox includes input and output shafts, a pair of clutches, and a pair of planetary gearsets. The input shaft receives torque from the electric motor. The output shaft outputs torque to the tractive element. The first clutch is operable to engage an element of the first planetary gearset and the second clutch is operable to engage an element of the second planetary gearset. The first clutch and the second clutch are operable to engage the element of the first planetary gearset and the second planetary gearset to transition the electric drive train between a park mode, a neutral mode, a first driving mode, and a second driving mode, and to provide braking for the electric drive train.

19 Claims, 23 Drawing Sheets

(51) Int. Cl.

| | |
|---|---|
| ***B62D 55/06*** | (2006.01) |
| ***B62D 55/125*** | (2006.01) |
| ***F15B 21/00*** | (2006.01) |
| ***F16H 3/64*** | (2006.01) |
| ***F16H 61/00*** | (2006.01) |
| ***F16H 61/30*** | (2006.01) |
| ***F16H 63/30*** | (2006.01) |
| *F16H 59/08* | (2006.01) |

(52) U.S. Cl.

CPC ............... *F15B 21/00* (2013.01); *F16H 3/64* (2013.01); *F16H 61/0059* (2013.01); *F16H 63/3026* (2013.01); *F16H 63/36* (2013.01); *F16H 2059/082* (2013.01); *F16H 2063/3033* (2013.01); *F16H 2200/0021* (2013.01); *F16H 2200/0034* (2013.01); *F16H 2200/2007* (2013.01); *F16H 2200/2035* (2013.01)

(56) References Cited

U.S. PATENT DOCUMENTS

| | | | | |
|---|---|---|---|---|
| 7,693,638 | B2 | 4/2010 | Costin et al. | |
| 8,543,304 | B2 | 9/2013 | Hilberer | |
| 10,352,372 | B2 | 7/2019 | Weidemann et al. | |
| 10,850,601 | B2 | 12/2020 | Han et al. | |
| 11,707,980 | B2 | 7/2023 | Payne | |
| 2007/0080236 | A1 | 4/2007 | Betz et al. | |
| 2007/0132309 | A1 | 6/2007 | Knop et al. | |
| 2007/0252432 | A1* | 11/2007 | Takamatsu | F16H 61/66259 303/167 |
| 2008/0194374 | A1* | 8/2008 | Diosi | F16H 3/66 475/275 |
| 2009/0088937 | A1 | 4/2009 | Matsubara et al. | |
| 2009/0098976 | A1 | 4/2009 | Usoro et al. | |
| 2009/0205910 | A1 | 8/2009 | Cahill | |
| 2011/0139571 | A1 | 6/2011 | Acker et al. | |
| 2011/0168502 | A1 | 7/2011 | Linhoff et al. | |
| 2011/0312459 | A1 | 12/2011 | Morrow et al. | |
| 2013/0196806 | A1 | 8/2013 | Morrow et al. | |
| 2013/0317683 | A1 | 11/2013 | Terakawa et al. | |
| 2014/0000990 | A1 | 1/2014 | Shiraki | |
| 2014/0269145 | A1 | 9/2014 | Fasana et al. | |
| 2015/0283894 | A1 | 10/2015 | Morrow et al. | |
| 2016/0238110 | A1 | 8/2016 | Morrow et al. | |
| 2016/0273650 | A1 | 9/2016 | Fujii et al. | |
| 2016/0288779 | A1 | 10/2016 | Kotloski et al. | |
| 2016/0288780 | A1 | 10/2016 | Shukla et al. | |
| 2016/0311253 | A1 | 10/2016 | Palmer et al. | |
| 2016/0361987 | A1 | 12/2016 | Morrow et al. | |
| 2017/0108085 | A1 | 4/2017 | Morrow et al. | |
| 2017/0113742 | A1 | 4/2017 | Tratta et al. | |
| 2017/0136870 | A1* | 5/2017 | Littlefield | B60K 6/365 |
| 2017/0246946 | A1 | 8/2017 | Morrow et al. | |
| 2017/0246947 | A1 | 8/2017 | Kotloski et al. | |
| 2017/0253229 | A1 | 9/2017 | Shukla et al. | |
| 2017/0363180 | A1 | 12/2017 | Steinberger et al. | |
| 2017/0370446 | A1 | 12/2017 | Steinberger et al. | |
| 2018/0031085 | A1 | 2/2018 | Steinberger et al. | |
| 2018/0162351 | A1 | 6/2018 | Shukla et al. | |
| 2018/0222484 | A1 | 8/2018 | Shively et al. | |
| 2018/0259042 | A1 | 9/2018 | Morrow et al. | |
| 2018/0326832 | A1 | 11/2018 | Kotloski et al. | |
| 2018/0345783 | A1 | 12/2018 | Morrow et al. | |
| 2019/0111910 | A1 | 4/2019 | Shukla et al. | |
| 2019/0242460 | A1 | 8/2019 | Morrow et al. | |
| 2019/0366828 | A1 | 12/2019 | Morrow et al. | |
| 2020/0018332 | A1 | 1/2020 | Malloy | |
| 2020/0039341 | A1 | 2/2020 | Morrow et al. | |
| 2020/0040984 | A1 | 2/2020 | Chen et al. | |
| 2020/0062059 | A1* | 2/2020 | Watling | B63H 1/34 |
| 2020/0200237 | A1 | 6/2020 | Steinberger et al. | |
| 2020/0200238 | A1 | 6/2020 | Steinberger et al. | |
| 2020/0307530 | A1 | 10/2020 | Georgin | |
| 2020/0346855 | A1 | 11/2020 | Rocholl et al. | |
| 2020/0346856 | A1 | 11/2020 | Rocholl et al. | |
| 2020/0346857 | A1 | 11/2020 | Rocholl et al. | |
| 2020/0346858 | A1 | 11/2020 | Buege et al. | |
| 2020/0346859 | A1 | 11/2020 | Buege et al. | |
| 2020/0346860 | A1 | 11/2020 | Buege et al. | |
| 2020/0346861 | A1 | 11/2020 | Rocholl et al. | |
| 2020/0346862 | A1 | 11/2020 | Rocholl et al. | |
| 2020/0347659 | A1 | 11/2020 | Rocholl et al. | |
| 2020/0399107 | A1 | 12/2020 | Buege et al. | |
| 2021/0018072 | A1 | 1/2021 | Steinberger et al. | |
| 2021/0140517 | A1 | 5/2021 | Steinberger et al. | |
| 2021/0178890 | A1 | 6/2021 | Steinberger et al. | |
| 2021/0188076 | A1 | 6/2021 | Morrow et al. | |
| 2022/0025960 | A1 | 1/2022 | Steinberger et al. | |
| 2022/0106114 | A1 | 4/2022 | Buege et al. | |
| 2022/0106115 | A1 | 4/2022 | Buege et al. | |
| 2022/0169444 | A1 | 6/2022 | Rocholl et al. | |
| 2022/0267090 | A1 | 8/2022 | Rocholl et al. | |
| 2022/0307312 | A1 | 9/2022 | Rocholl et al. | |
| 2022/0340359 | A1 | 10/2022 | Rocholl et al. | |
| 2022/0380123 | A1 | 12/2022 | Buege et al. | |
| 2022/0389989 | A1* | 12/2022 | Mattsson | B60K 17/00 |
| 2023/0039974 | A1 | 2/2023 | Rocholl et al. | |
| 2023/0278786 | A1 | 9/2023 | Rocholl et al. | |
| 2023/0286741 | A1 | 9/2023 | Buege et al. | |
| 2023/0382640 | A1 | 11/2023 | Buege et al. | |
| 2023/0407695 | A1 | 12/2023 | Rocholl et al. | |
| 2024/0066981 | A1 | 2/2024 | Schimke et al. | |
| 2024/0116706 | A1 | 4/2024 | Rocholl et al. | |
| 2024/0117878 | A1* | 4/2024 | Mattsson | F16H 61/0059 |
| 2024/0131728 | A1 | 4/2024 | Buege et al. | |
| 2024/0166434 | A1 | 5/2024 | Rocholl et al. | |
| 2024/0167541 | A1 | 5/2024 | Steinberger et al. | |
| 2024/0217732 | A1 | 7/2024 | Wente et al. | |
| 2024/0217735 | A1 | 7/2024 | Rocholl et al. | |

FOREIGN PATENT DOCUMENTS

| | | | |
|---|---|---|---|
| DE | 10 2012 007 622 | A1 | 10/2013 |
| DE | 102020206125 | A1 * | 11/2021 |
| JP | 2006-161899 | A | 6/2006 |
| KR | 20180138420 | A | 12/2018 |

OTHER PUBLICATIONS

International Search Report and Written Opinion issued in connection with PCT/US2024/028871 dated Mar. 4, 2025.

International Search Report and Written Opinion issued in connection with PCT/US2024/048164 dated Jan. 23, 2025.

International Search Report and Written Opinion issued in connection with PCT Appl. No. PCT/US2023/024323 dated Jan. 23, 2024.

Invitation to Pay Additional Fees issued in connection with PCT Appl. No. PCT/US2023/024323 dated Dec. 8, 2023.

* cited by examiner

ELECTRIC MOTOR GEARBOX WITH INTEGRATED BRAKE

CROSS-REFERENCE TO RELATED PATENT APPLICATIONS

This application claims the benefit of and priority to U.S. Provisional Application No. 63/466,093, filed May 12, 2023, and U.S. Provisional Application No. 63/466,120, filed May 12, 2023, the entire disclosures both of which are incorporated by reference herein.

BACKGROUND

The present disclosure relates to a tracked vehicle. More particularly, the present disclosure relates to a drive system for a tracked vehicle.

SUMMARY

One implementation of the present disclosure is an electric drive train for a military vehicle, according to some embodiments. In some embodiments, the electric drive train includes an electric motor, and a gearbox. The gearbox is configured to be driven by the electric motor and drive a tractive element of the military vehicle, according to some embodiments. In some embodiments, the gearbox includes an input shaft, an output shaft, a first planetary gear set, and a second planetary gear set. In some embodiments, the input shaft is configured to receive torque from the electric motor. In some embodiments, the output shaft is configured to output torque to the tractive element. In some embodiments, the first clutch is operable to engage an element of the first planetary gear set and the second clutch is operable to engage an element of the second planetary gear set. In some embodiments, the first clutch and the second clutch are operable to engage the element of the first planetary gear set and the second planetary gear set to transition the electric drive train between a park mode, a neutral mode, a first driving mode, and a second driving mode, and to provide braking for the electric drive train.

In some embodiments, the first planetary gear set includes a first sun gear, a plurality of first planet gears, a first ring gear, and a first carrier. In some embodiments, the first clutch is operable to engage the first ring gear.

In some embodiments, the second planetary gear set includes a second sun gear, a plurality of second planet gears, a second ring gear, and a second carrier. In some embodiments, the second clutch is operable to engage the second ring gear.

In some embodiments, the first carrier is coupled with the second ring gear such that rotation of the first carrier drives rotation of the second ring gear. In some embodiments, the output shaft of the gearbox is coupled with and driven by the second carrier.

In some embodiments, the gearbox is operable in the park mode by operating the first clutch and the second clutch into an engaged state to engage a first ring gear of the first planetary gear set and a second ring gear of the second planetary gear set to limit rotation of the output shaft. In some embodiments, the gearbox is operable in a neutral mode of operation wherein the first clutch and the second clutch are both transitioned in a disengaged state to allow rotation of the first ring gear and the second ring gear and allow rotation of the output shaft.

In some embodiments, the gearbox is operable in the first driving mode in which the first clutch is transitioned into an engaged state and the second clutch is transitioned into a disengaged state. In some embodiments, the gearbox is configured to transfer torque from the electric motor to the output shaft while operating according to the first driving mode to transport the military vehicle, and the second clutch is configured to transition into a partially engaged state to provide a braking force to a ring gear of the second planetary gear set and perform a braking operation for the military vehicle. In some embodiments, the gearbox is operable in the second driving mode in which the second clutch is transitioned into the engaged state and the first clutch is transitioned into the disengaged state. In some embodiments, the gearbox is configured to transfer torque from the electric motor to the output shaft while operating according to the second driving mode to transport the military vehicle, and the first clutch is configured to transition into a partially engaged state to provide a braking force to a ring gear of the first planetary gear set and perform a braking operation for the military vehicle.

In some embodiments, the gearbox is operable in the park mode by transitioning both the first clutch and the second clutch into an engaged state such that rotation of the output shaft is limited. In some embodiments, the gearbox is operable in the neutral mode by transitioning both the first clutch and the second clutch into a disengaged state such that rotation of the output shaft is de-coupled from rotation of the input shaft. In some embodiments, the gearbox is operable in the first driving mode by transitioning the first clutch into the engaged state such that torque is transferred from the input shaft to the output shaft through the first planetary gear set. In some embodiments, in the first driving mode, the second clutch is configured to partially transition into the engaged state to provide braking for the military vehicle. In some embodiments, the gearbox is operable in the second driving mode by transitioning the second clutch into the engaged state such that torque is transferred from the input shaft to the output shaft through the second planetary gear set. In some embodiments, in the second driving mode, the first clutch is configured to partially transition into the engaged state to provide braking for the military vehicle. In some embodiments, the first planetary gear set and the second planetary gear set have different gear ratios such that the first driving mode is a high mode and the second driving mode is a low mode.

Another implementation of the present disclosure is an electric military vehicle, according to some embodiments. In some embodiments, the electric military vehicle includes a tractive element and an electric driveline. In some embodiments, the electric driveline includes an electric motor and a gearbox. In some embodiments, the gearbox is configured to be driven by the electric motor and drive the tractive element of the electric military vehicle. In some embodiments, the gearbox includes an input shaft, an output shaft, a first planetary gearset and a second planetary gearset, and a first clutch and a second clutch. In some embodiments, the input shaft is configured to receive torque from the electric motor. In some embodiments, the output shaft is configured to output torque to the tractive element. In some embodiments, the first clutch is operable to engage an element of the first planetary gear set and the second clutch is operable to engage an element of the second planetary gear set. In some embodiments, the first clutch and the second clutch are operable to engage the element of the first planetary gear set and the second planetary gear set to transition the electric driveline between a park mode, a neutral mode, a first driving mode, and a second driving mode, and to provide braking for the electric driveline.

In some embodiments, the first planetary gear set includes a first sun gear, a plurality of first planet gears, a first ring gear, and a first carrier. In some embodiments, the first clutch is operable to engage the first ring gear. In some embodiments, the second planetary gear set includes a second sun gear, a plurality of second planet gears, a second ring gear, and a second carrier, wherein the second clutch is operable to engage the second ring gear.

In some embodiments, the first carrier is coupled with the second ring gear such that rotation of the first carrier drives rotation of the second ring gear. In some embodiments, the output shaft of the gearbox is coupled with and driven by the second carrier.

In some embodiments, the gearbox is operable in the park mode by operating the first clutch and the second clutch into an engaged state to engage a first ring gear of the first planetary gear set and a second ring gear of the second planetary gear set to limit rotation of the output shaft. In some embodiments, the gearbox is operable in a neutral mode of operation wherein the first clutch and the second clutch are both transitioned in a disengaged state to allow rotation of the first ring gear and the second ring gear and allow rotation of the output shaft.

In some embodiments, the gearbox is operable in the first driving mode in which the first clutch is transitioned into an engaged state and the second clutch is transitioned into a disengaged state. In some embodiments, the gearbox is configured to transfer torque from the electric motor to the output shaft while operating according to the first driving mode to transport the electric military vehicle, and the second clutch is configured to transition into a partially engaged state to provide a braking force to a ring gear of the second planetary gear set and perform a braking operation for the electric military vehicle. In some embodiments, the gearbox is operable in the second driving mode in which the second clutch is transitioned into the engaged state and the first clutch is transitioned into the disengaged state. In some embodiments, the gearbox is configured to transfer torque from the electric motor to the output shaft while operating according to the second driving mode to transport the electric military vehicle, and the first clutch is configured to transition into a partially engaged state to provide a braking force to a ring gear of the first planetary gear set and perform a braking operation for the electric military vehicle.

In some embodiments, the gearbox is operable in the park mode by transitioning both the first clutch and the second clutch into an engaged state such that rotation of the output shaft is limited. In some embodiments, the gearbox is operable in the neutral mode by transitioning both the first clutch and the second clutch into a disengaged state such that rotation of the output shaft is de-coupled from rotation of the input shaft. In some embodiments, the gearbox is operable in the first driving mode by transitioning the first clutch into the engaged state such that torque is transferred from the input shaft to the output shaft through the first planetary gear set. In some embodiments, in the first driving mode, the second clutch is configured to partially transition into the engaged state to provide braking for the electric military vehicle. In some embodiments, the gearbox is operable in the second driving mode by transitioning the second clutch into the engaged state such that torque is transferred from the input shaft to the output shaft through the second planetary gear set. In some embodiments, in the second driving mode, the first clutch is configured to partially transition into the engaged state to provide braking for the electric military vehicle. In some embodiments, the first planetary gear set and the second planetary gear set have different gear ratios such that the first driving mode is a high mode and the second driving mode is a low mode. In some embodiments, the tractive element is a track.

Another implementation of the present disclosure is a gearbox for a tracked military vehicle, according to some embodiments. In some embodiments, the gearbox includes an input shaft, an output shaft, a first planetary gear set and a first clutch, a second planetary gear set and a second clutch. In some embodiments, the input shaft is configured to receive input torque. In some embodiments, the output shaft is configured to provide output torque. In some embodiments, the first clutch and the second clutch are transitionable between an engaged state in which the first clutch or the second clutch engage a corresponding element of the first planetary gearset or the second planetary gearset and a disengaged state in which the first clutch or the second clutch do not engage the corresponding element of the first planetary gearset and the second planetary gearset. In some embodiments, the gearbox is transitionable into a park mode in which rotation of the output shaft is limited by transitioning both the first clutch and the second clutch into the engaged state. In some embodiments, the gearbox is transitionable into a neutral mode in which rotation of the output shaft is not limited by transitioning both the first clutch and the second clutch into the disengaged state. In some embodiments, the gearbox is transitionable into a first driving mode and a second driving mode by transitioning one of the first clutch or the second clutch into the engaged state. In some embodiments, braking is provided in the first driving mode or the second driving mode by partially engaging a disengaged one of the first clutch or the second clutch.

In some embodiments, the first clutch and the second clutch have differently sized clutch pads. In some embodiments, the first planetary gearset and the second planetary gearset have different gear ratios such that in the first driving mode, the output shaft is driven according to higher torque and lower speed than the second driving mode.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a gearbox includes two planetary gear sets arranged serially and driven by an electric motor. The electric motor drives the sun gears of both the first planetary gear set and the second planetary gear set. A carrier of the planetary gears of the first planetary gear set is coupled with a ring gear of the second planetary gear set. The gear box also includes a first clutch configured to engage a ring gear of the first planetary gear set and a second clutch configured to engage the ring gear of the second planetary gear set. A carrier of the second planetary gear set is coupled with an output driveshaft to drive a tractive element of a military vehicle. The first clutch and the second clutch may both be engaged to transition the gearbox into a park mode. The first clutch and the second clutch may both be disengaged to transition the gearbox into a neutral mode. The first clutch may be fully engaged to transition the military vehicle into a first driving mode (e.g., a high mode) with the second clutch fully disengaged. When the gearbox is in the first driving mode, the second clutch can be partially engaged to provide braking. The second clutch may be fully engaged to transition the military vehicle into a second driving mode (e.g., a low mode) with the first clutch fully disengaged. When the gearbox is in the second driving mode, the first cutch can be partially engaged to provide braking.

The military vehicle may also include a control system that receives control inputs from an operator and transitions the gearbox between the modes as described herein. The control system may include a controller that operates a hydraulic system (e.g., solenoids, pumps, etc.) to pressurize one or more chambers in order to control engagement or disengagement of the first clutch and the second clutch. The control system may limit transition between the first driving mode and the second driving mode in response to the military vehicle transporting at a speed greater than a threshold. The control system may also use brake inputs in combination with speed feedback or measured pressure of chambers corresponding to the first clutch and the second clutch to provide variable pressurization of the chambers to perform braking using the first clutch or the second clutch.

Tracked Vehicle

Figure 1:
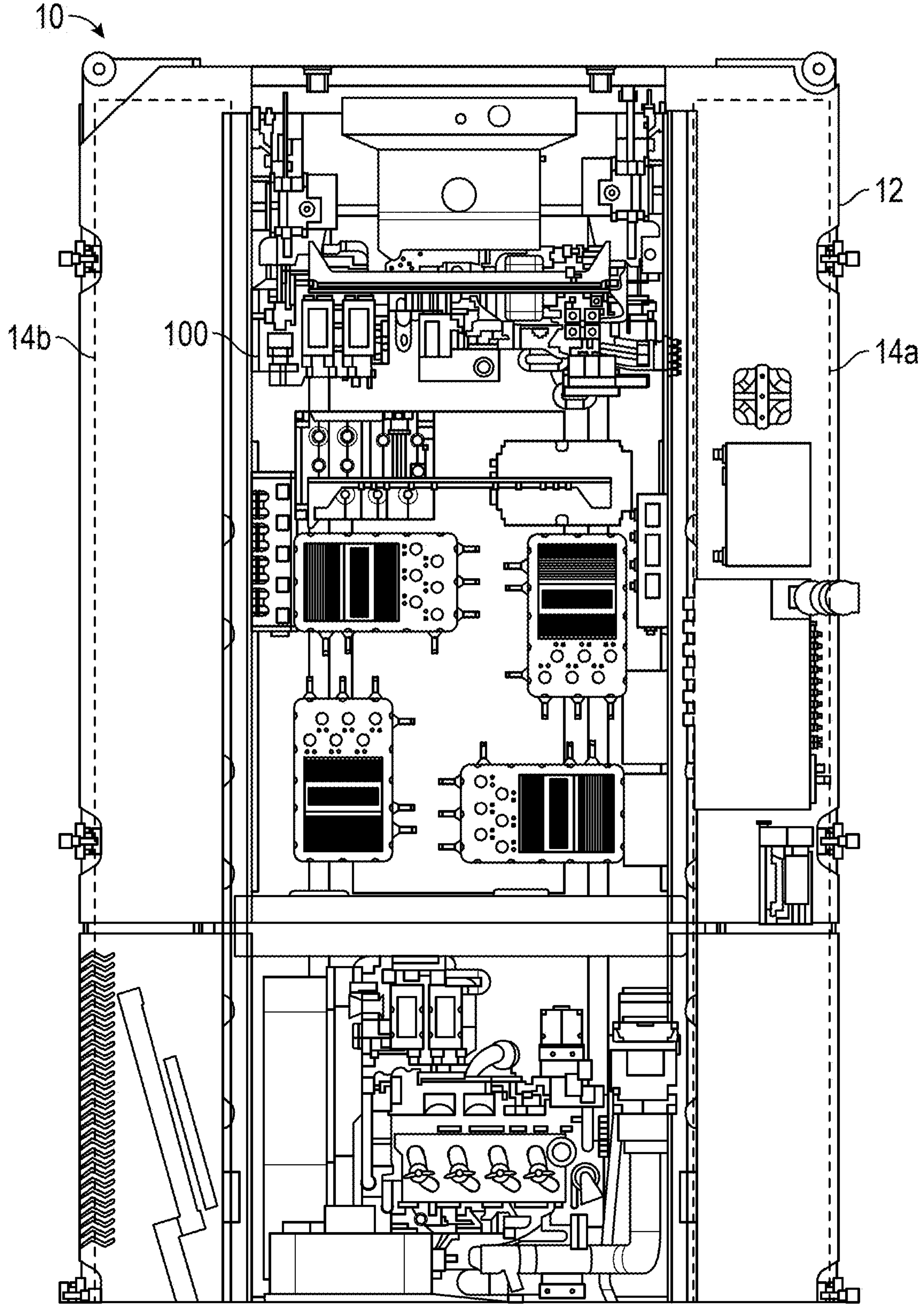
FIG. 1 is a top view of a rear portion of a vehicle including an electric drive system, according to some embodiments.

Referring to FIG. 1, a vehicle 10 includes a body 12 that is positioned on a chassis or a frame. The vehicle 10 may be a tracked vehicle including a first track **14*a* and a second track 14*b* positioned on opposite lateral sides of the body 12. The tracks 14 are configured to be driven (e.g., by a drive drum) to drive transportation of the vehicle 10. In some embodiments, the tracks 14 include multiple followers that are rotatably coupled with the body 12 or the chassis and are driven to rotate by movement of the tracks 14. The vehicle 10 may be a fighting vehicle, a manned vehicle, a military vehicle, an electric military vehicle, an unmanned vehicle, a robotic combat vehicle, etc. The vehicle 10 can include weaponry positioned around the body 12, various telematics or wireless control units, a control system, etc., such that the vehicle 10** can be transported by a remote operator.

Referring still to FIG. 1, the vehicle 10 includes a drive system 100 that is configured to drive one or more rollers, drums, etc., of the tracks 14 to thereby drive the tracks 14 and transport the vehicle 10. The vehicle 10 may include a separate drive system 100 for each of the track **14*a* and the track 14*b* and may operate the drive systems 100 at different speeds in order to perform steering or turning for the vehicle 10. The drive system 100 may be an electric drive system such that the vehicle 10** uses on-board electrical energy (e.g., batteries, capacitors, cells, energy store systems, etc.) to transport.

Drive System and Gearbox

Figure 2:
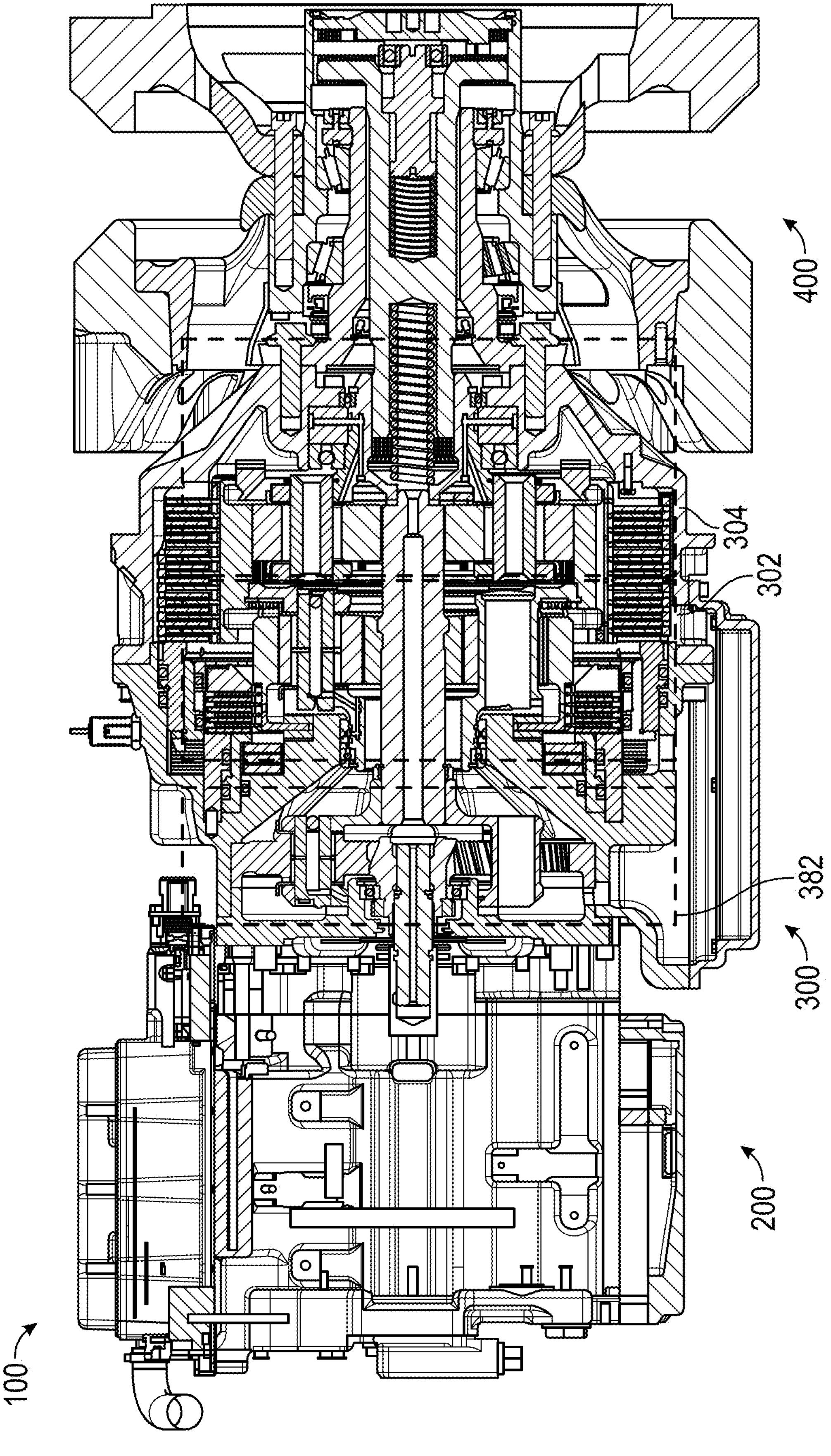
FIG. 2 is a sectional view of the electric drive system of FIG. 1, according to some embodiments.

Referring to FIG. 2, a sectional view of the drive system 100 is shown, according to some embodiments. The drive system 100 includes an electric motor 200, a gearbox 300, and a drive member 400. The electric motor 200 is configured to consume electrical energy and drive the drive member 400 through the gearbox 300. In some embodiments, the gearbox 300 functions as both a transmission and a brake in order to accelerate and decelerate the vehicle 10. In some embodiments, the drive member 400 is rotatably coupled on an output shaft of the gearbox 300 such that the gearbox 300 can transfer torque from the electric motor 200 to the drive member 400 and the tracks 14, and can also exert a deceleration torque on the drive member 400 in order to perform braking.

Figure 3:
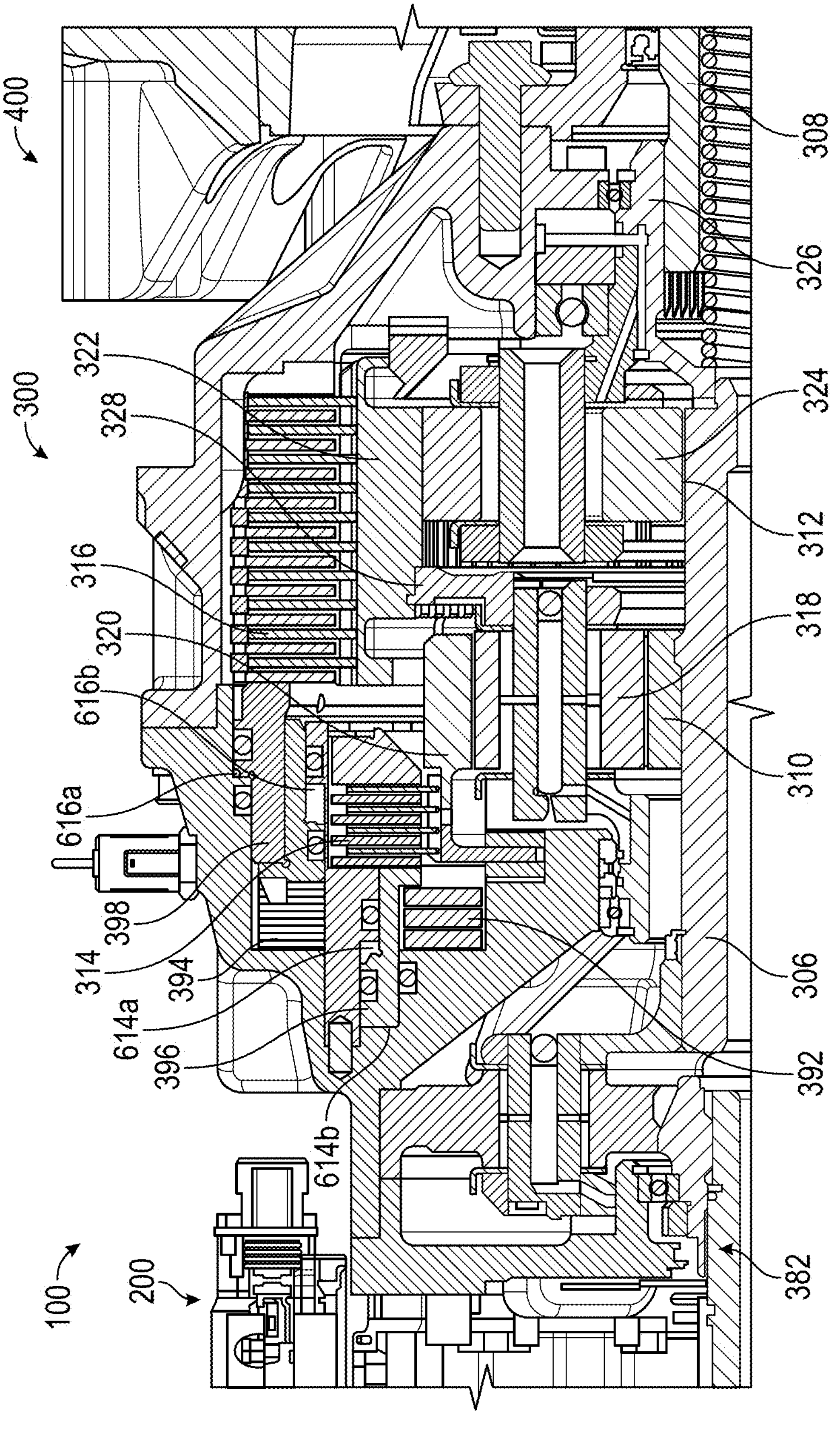
FIG. 3 is a sectional view of a gearbox of the electrical drive system of FIG. 1 in a park mode, according to some embodiments.
Figure 11:
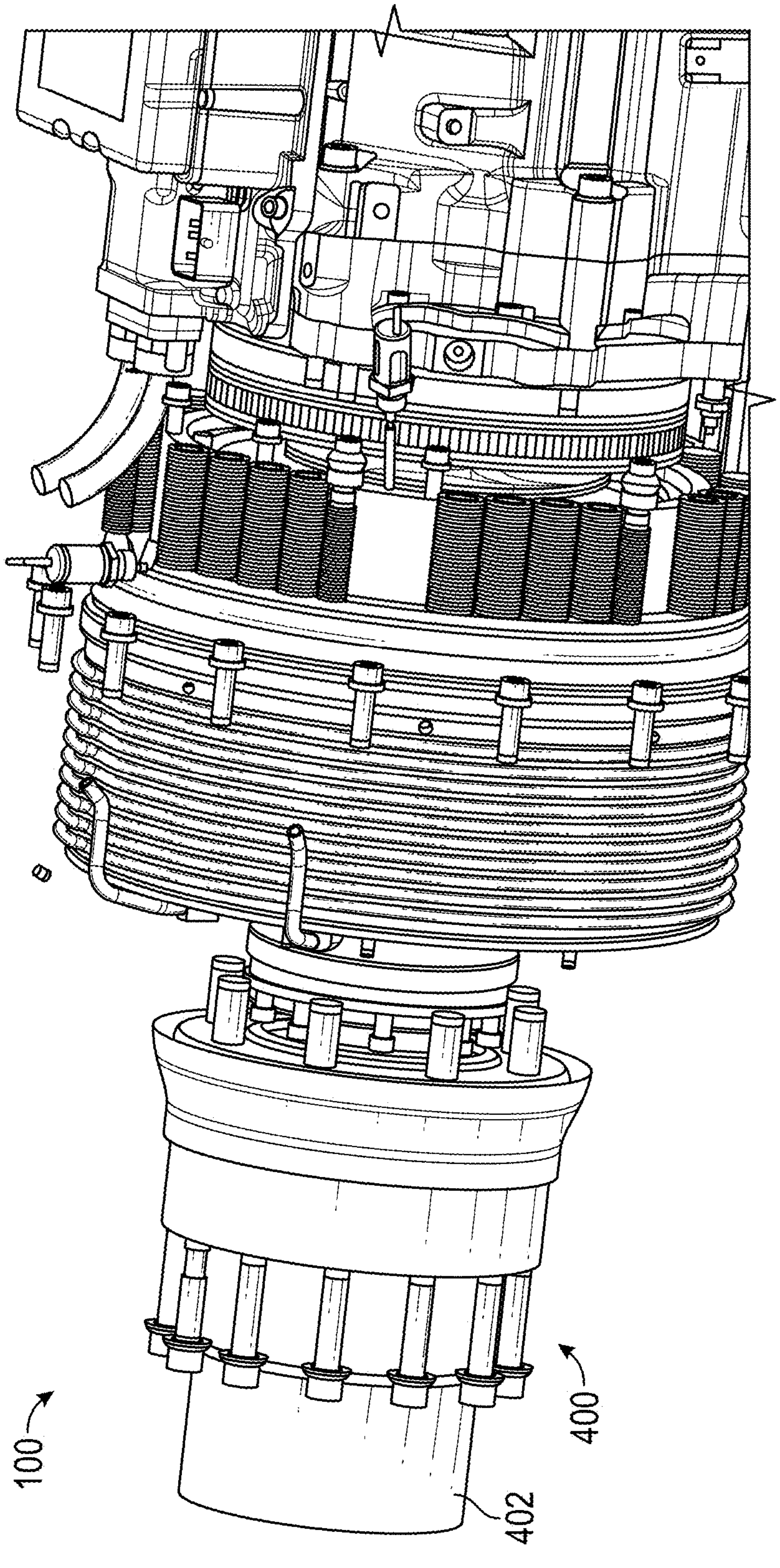
FIG. 11 is a perspective view of a manual disconnect of the electrical drive system of FIG. 1, according to some embodiments.
Figure 12:
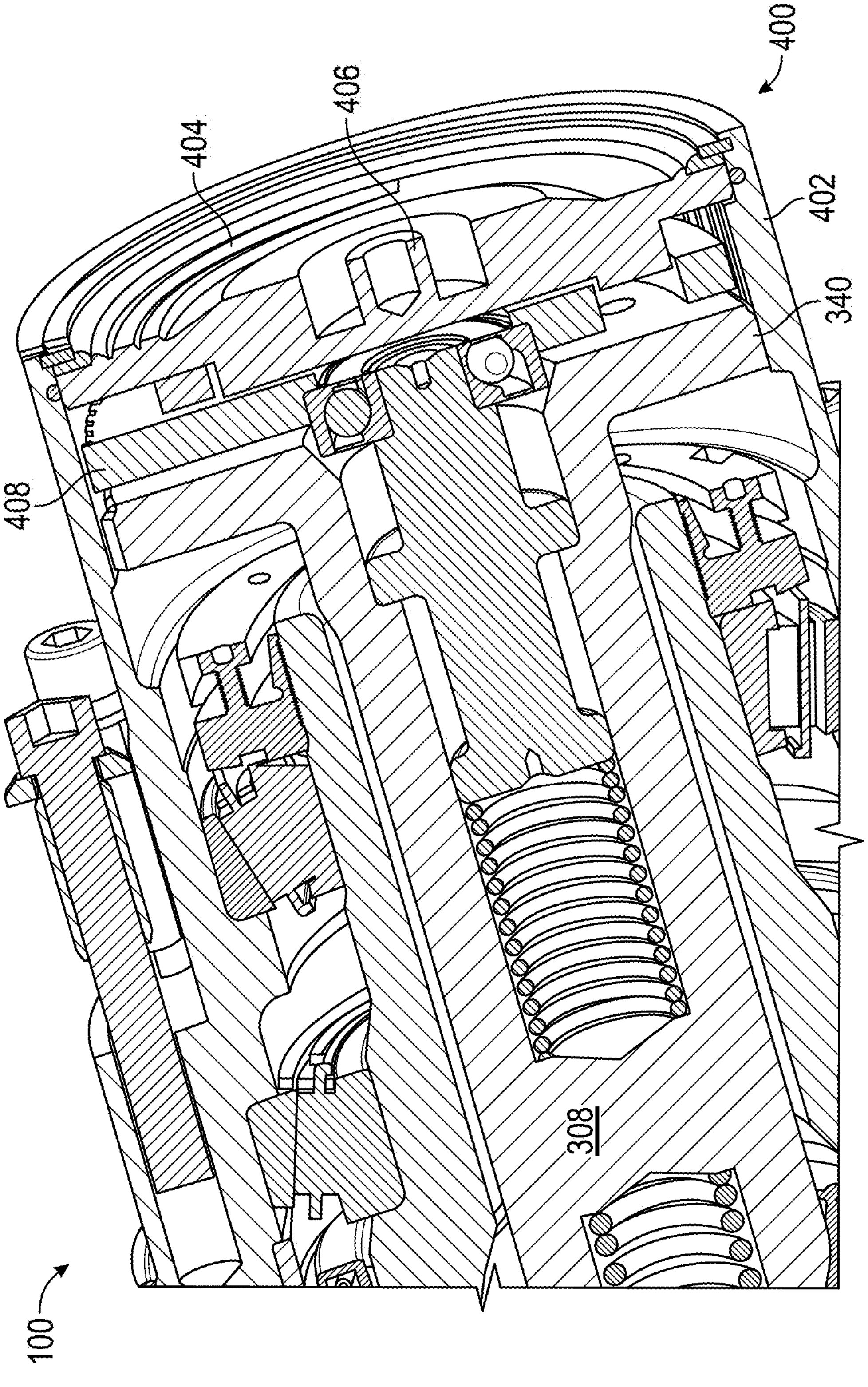
FIG. 12 is a perspective sectional view of the manual disconnect of FIG. 11, according to some embodiments.
Figure 13:
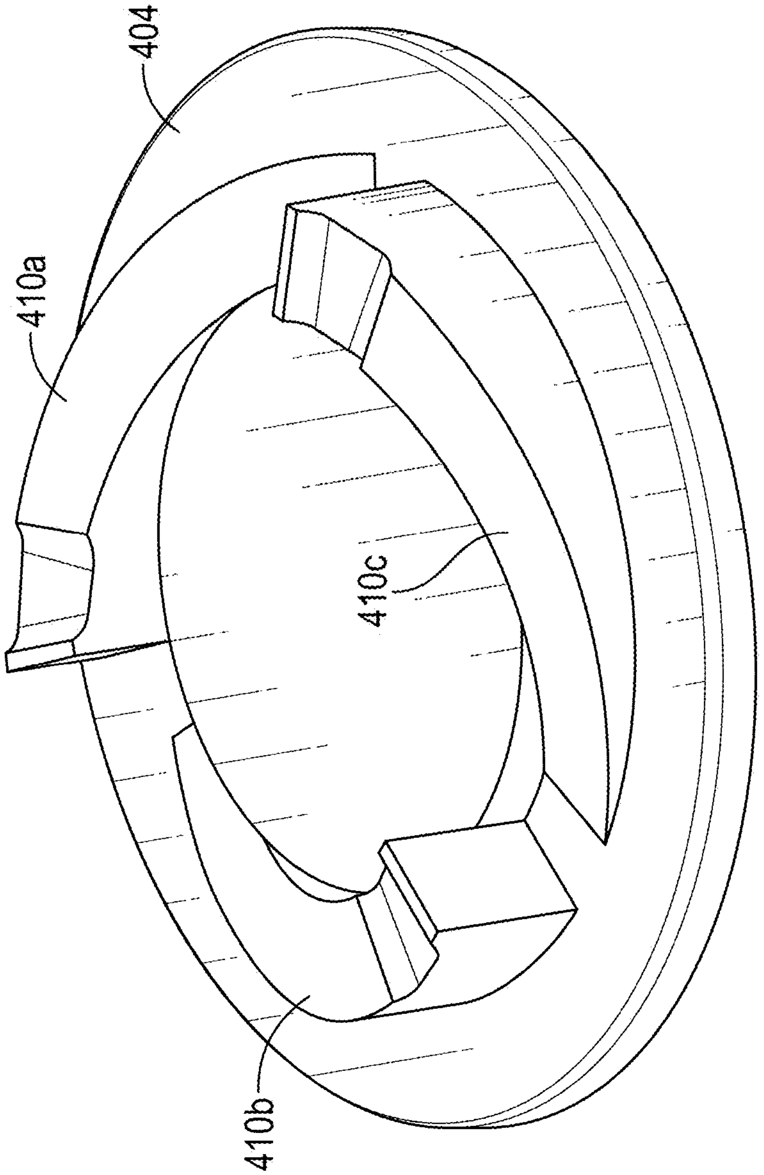
FIG. 13 is a perspective view of a cam plate of the manual disconnect of FIG. 11, according to some embodiments.
Figure 14:
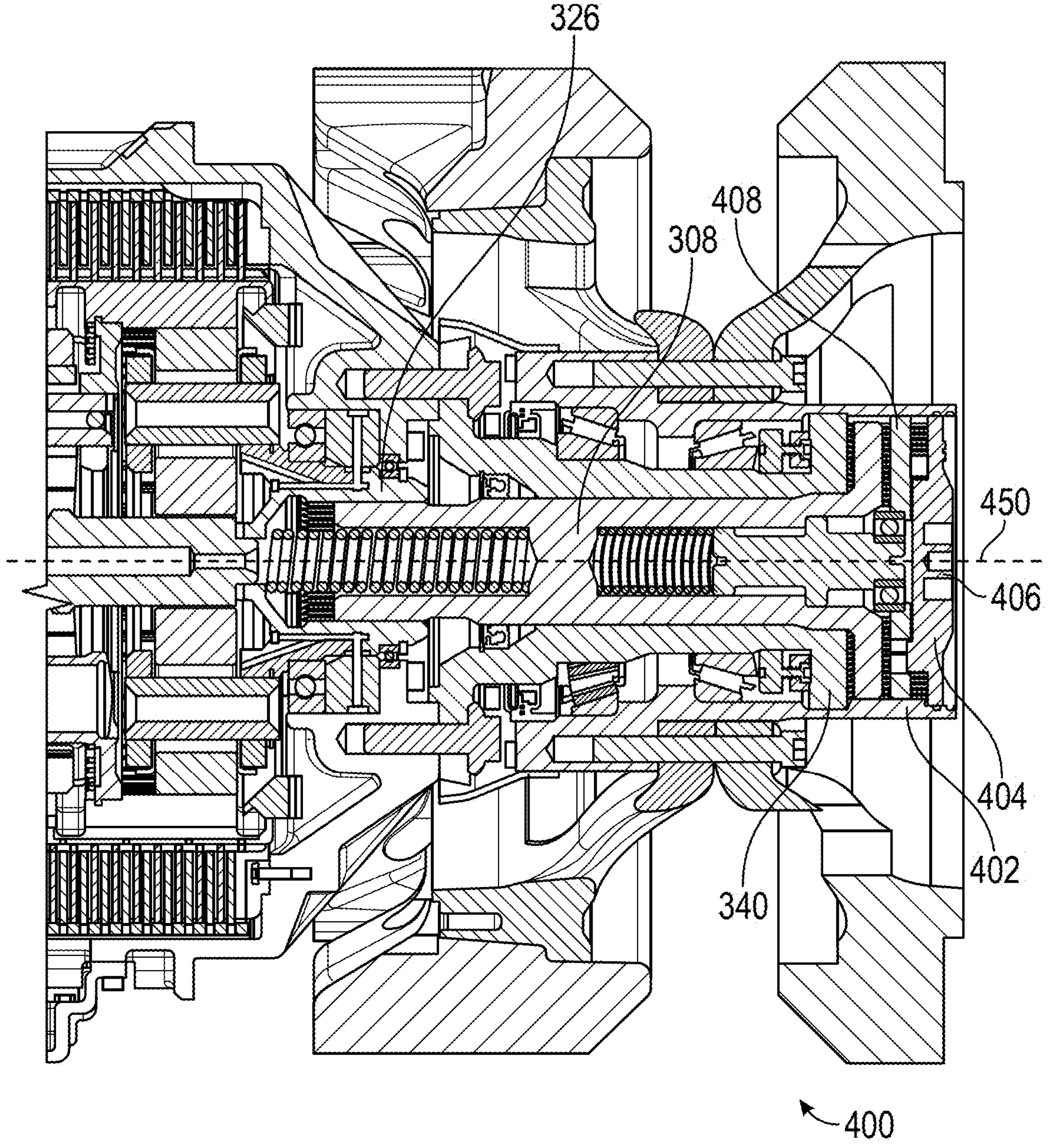
FIG. 14 is a sectional view of the manual disconnect of FIG. 11, according to some embodiments.

Referring to FIGS. 3 and 11, the gearbox 300 includes a first planetary gear set 302 and a second planetary gear set 304. The first planetary gear set 302 and the second planetary gear set 304 are arranged serially. The motor 200 is configured to provide an input torque to an input shaft 306 that is fixedly coupled with a sun gear 310 of the first planetary gear set 302 and a sun gear 312 of the second planetary gear set 304. The sun gear 310 and the sun gear 312 may be mounted on the input shaft 306 such that rotation of the input shaft 306 drives corresponding rotation of the sun gear 310 and the sun gear 312. The gearbox 300 also includes first planet gears 318 of the first planetary gear set 304 that mesh with the sun gear 310 of the first planetary gear set 302. The first planetary gear set 304 includes a carrier 328 that the first planet gears 318 are rotatably coupled on. The first planetary gear set 304 also includes a ring gear 320 that meshes with the first planet gear 318. The first planetary gear set 304 also includes a clutch or brake, shown as first brake 314 that is configured to selectively engage the ring gear 320 to either allow or limit rotation of the ring gear 320 of the first planetary gear set 302. The second planetary gear set 304 includes a ring gear 322, second planet gears 324, and a carrier 326. An output shaft 308 is coupled with the carrier 326 such that rotation of the carrier 326 of the second planet gear set 304 drives rotation of the output shaft 308. The second planet gears 324 of the second planetary gear set 304 mesh with the sun gear 312 and the ring gear 322. The ring gear 322 of the second planetary gear set 304 is coupled with the carrier 328 of the first planetary gear set 302 such that rotation of the carrier 328 of the first planetary gear set 302 drives rotation of the ring gear 322 of the second planetary gear set 304.

The second planetary gear set 304 also includes a clutch or brake 316 (e.g., a second brake) that is configured to engage the ring gear 322 of the second planetary gear set 304. The brake 316 may be configured to transition between a disengaged state such that rotation of the ring gear 322 of the second planetary gear set 304 is allowed or an engaged state such that rotation of the ring gear 322 of the second planetary gear set 304 is limited. In some embodiments, the brake 314 and the brake 316 are configured to partially transition into the engaged state in order to exert a braking force or deceleration on the output shaft 308 and thereby on the tracks 14. Transitioning the brake 314 or the brake 316 into the engaged state may fixedly couple the ring gear 320 or the ring gear 322, respectively, with a housing of the gearbox 300 (e.g., to fix the ring gear 320 or the ring gear 322).

Figure 8:
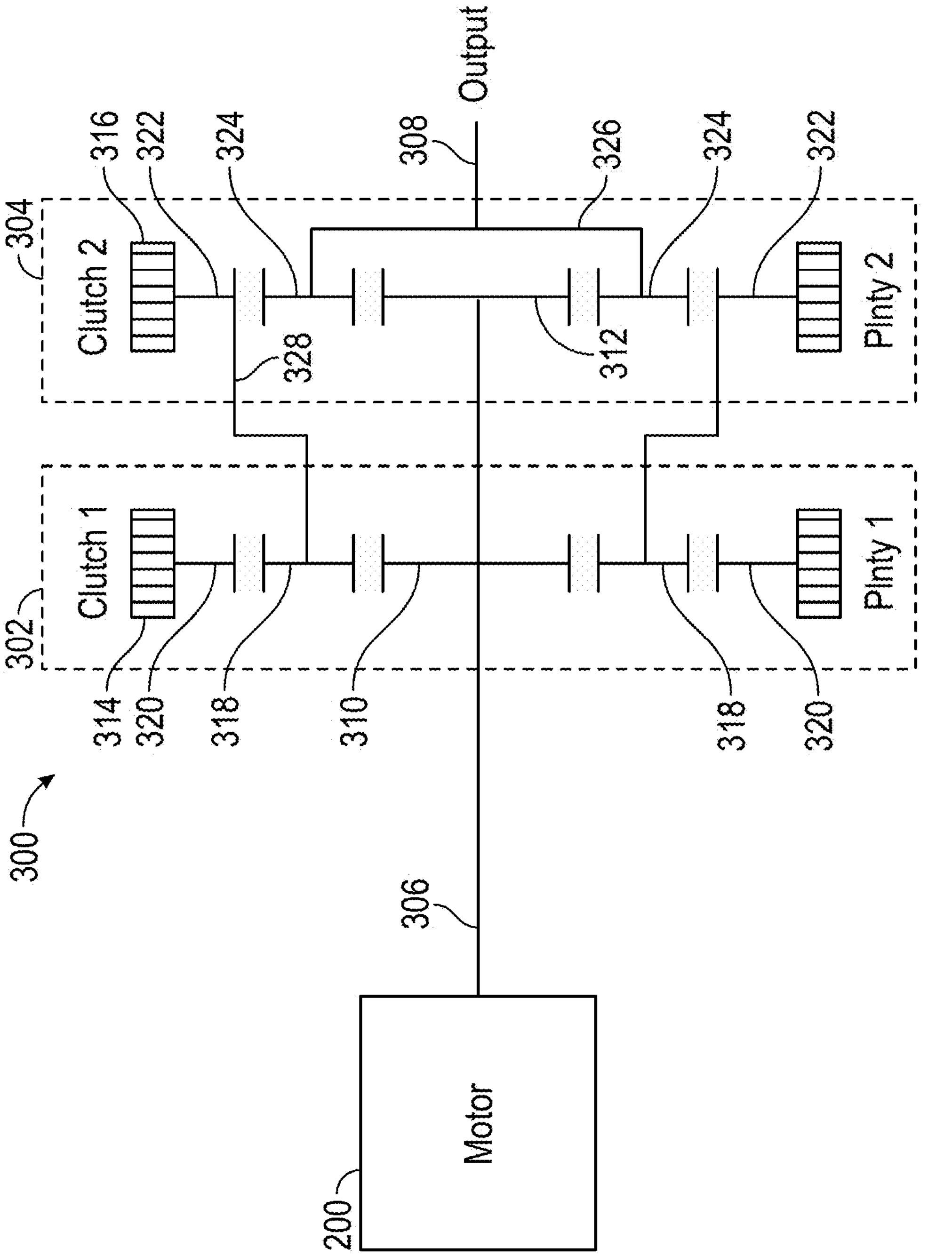
FIG. 8 is a block diagram of the gearbox of the electrical drive system of FIG. 1, according to some embodiments.

Referring to FIGS. 3 and 8, the brake 314 and the brake 316 can be transitioned between the disengaged and the engaged state in order to transition the gearbox 300 between a park state or mode, a neutral state or mode, a high range state or mode, and a low range state or mode. When both the brake 314 and the brake 316 are transitioned into the engaged state, the gearbox 300 is transitioned into the park mode and the output shaft 308 and thereby the tracks 14 are limited from rotating (e.g., the gearbox 300 is locked). When both the brake 314 and the brake 316 are transitioned into the disengaged state, the gearbox 300 is transitioned into the neutral mode and the output shaft 308 can be rotated freely relative to the input shaft 306. When the brake 314 is engaged and the brake 316 is disengaged, the gear ratio between the input shaft 306 and the output shaft 308 is defined by the first planetary gear set 302, and the gearbox 300 is in the high range mode for higher speeds. The first planetary gear set 302 defines a higher gear ratio with respect to the second planetary gear set 302 such that the output shaft 308 is driven at a higher speed with a lower torque. When the gearbox 300 is in the high range mode, the brake 316 may selectively and partially transitioned into the engaged state to thereby provide a braking force (e.g., partially transitioning from the high range mode into the park mode to provide braking).

When the brake 316 is transitioned into the engaged state and the brake 314 is transitioned into the disengaged state, the gearbox 300 is in the low range mode for lower speeds but higher torque output (e.g., compared to the high range mode). When the brake 316 is engaged and the brake 314 is disengaged, the gear ratio between the input shaft 306 and the output shaft 308 is defined by the second planetary gear set 304. When the gearbox 300 is in the low range mode, the brake 314 can be selectively and partially transitioned into the engaged state to thereby provide a braking force (e.g., partially transitioning from the low range mode into the park mode to provide braking).

Referring still to FIGS. 3 and 8, the brake 316 may have a higher capacity or load rating (e.g., greater surface area, greater braking torque ability, etc.) than the brake 314 since the brake 316 is configured to transfer higher torque from the input shaft 306 to the output shaft 308 in the low range mode, and is also configured to function as a brake when the vehicle 10 is operating at higher speeds (e.g., when the gearbox 300 is in the high range mode) and therefore has a higher kinetic energy or momentum (which requires greater braking force to decelerate the vehicle 10). Advantageously, the gearbox 300 includes the brake 314 and the brake 316 which can function both to transfer torque for driving operations, and can also operate as brakes to decelerate the vehicle 10.

Figure 4:
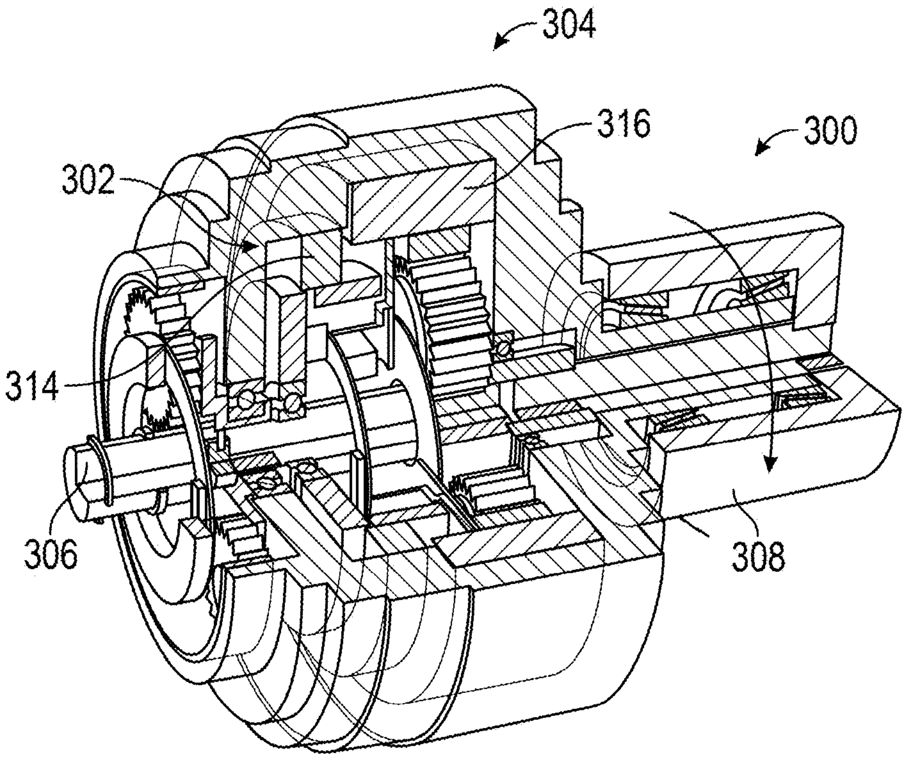
FIGS. 4-5 are perspective view of the gearbox of the electrical drive system of FIG. 1 in the low range mode, according to some embodiments.
Figure 5:
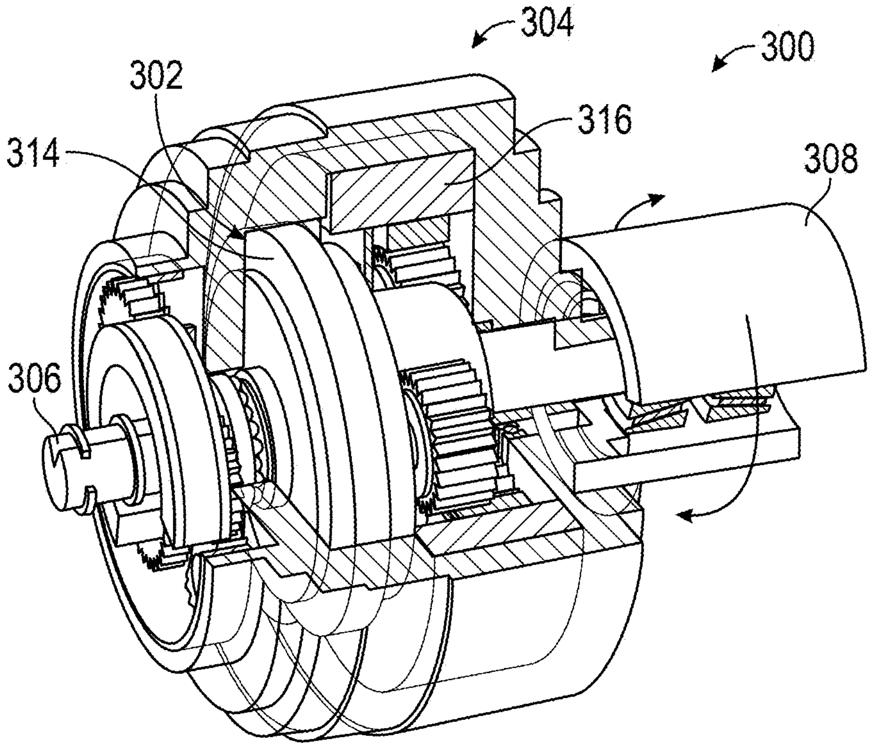
Figure 6:
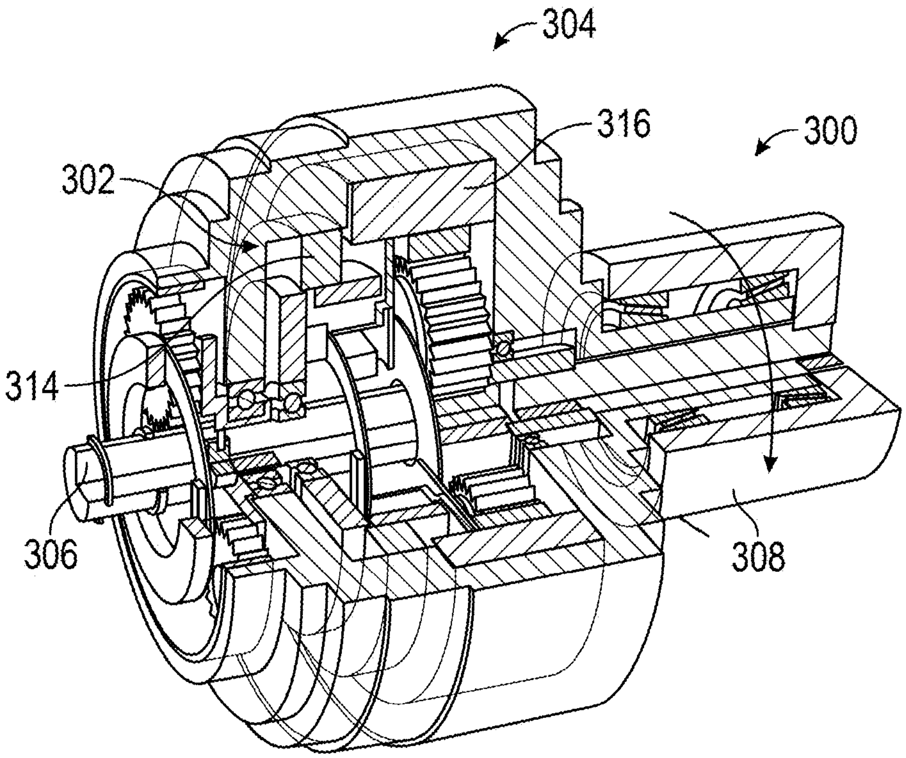
FIGS. 6-7 are perspective views of the gearbox of the electrical drive system of FIG. 1 in the high range mode, according to some embodiments.
Figure 7:
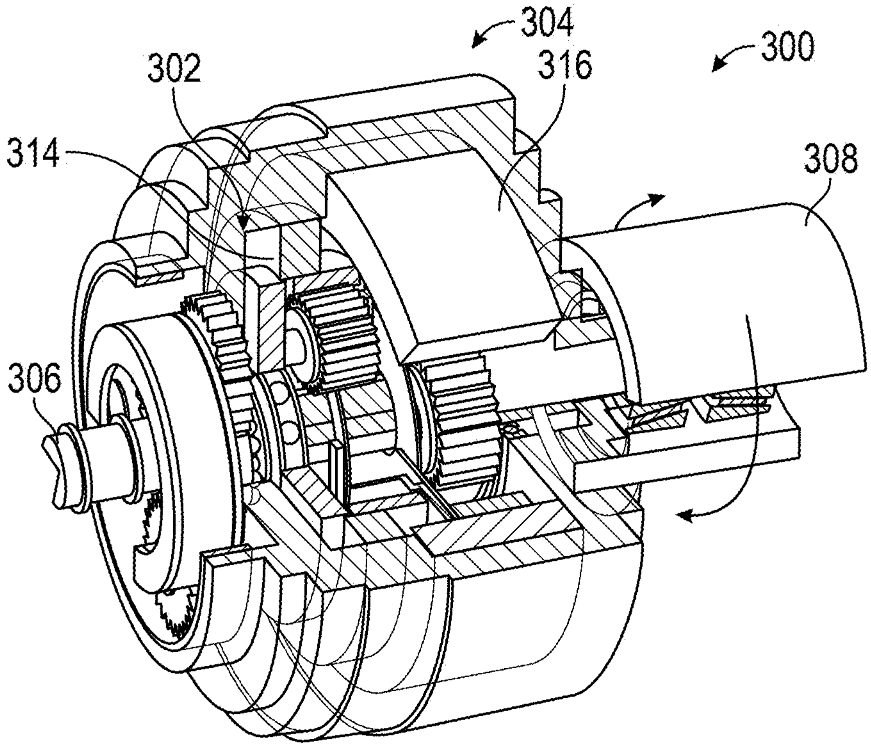

Referring to FIGS. 4-5, the gear box 300 is shown operating in the low range mode with the brake 316 in the engaged state or position. When the gearbox 300 operates in the low range mode, the brake 314 may be selectively or partially engaged to provide a braking force to decelerate the vehicle 10. Referring to FIGS. 6-7, the gear box 300 is shown operating in the high range mode with the brake 314 in the engaged state or position. When the gearbox 300 operates in the high range mode, the brake 316 may be selectively or partially engaged to provide a braking force to decelerate the vehicle 10.

Referring again to FIGS. 3 and 8, the brake 314 and the brake 316 may be pneumatically or hydraulically actuated. In some embodiments, the brake 314 and the brake 316 are driven by pressurization of a corresponding chamber such that the brake 314 and the brake 316 apply a corresponding clamping or braking force to the ring gear 320 and the ring gear 322, respectively. In some embodiments, when the brake 314 and the brake 316 are transitioned into the engaged state or position (e.g., the fully engaged state or position), the corresponding chamber is pressurized to a maximum amount such that the brake 314 and the brake 316 exert a maximum clamping or braking force to the ring gear 320 and the ring gear 322, respectively. When one of the brake 314 and the brake 316 is used for braking or deceleration of the vehicle 10, the corresponding chamber of a first of the brake 314 and the brake 316 may be pressurized to a degree or amount that is less than the maximum amount such that the first of the brake 314 and the brake 316 exerts a braking force to decelerate the vehicle 10, while a second of the brake 314 and the brake 316 exerts the maximum clamping or braking force (e.g., the corresponding chamber of the second of the brake 314 and the brake 316 is pressurized to the maximum amount).

Referring particularly to FIG. 3, the gearbox 300 may include a spring 392 configured to bias a member 396 to translate to transition the brake 314 into an engaged position. The brake 314 may be actuated hydraulically by filling a first chamber **614*a* in order to drive the member 396 such that the brake 314 is disengaged (e.g., to drive translation of the member 396 in a first direction). The brake 314 may also be actuated hydraulically by filling a second chamber 614*b* to drive the member 396 such that the brake 314 is engaged (e.g., to drive translation of the member 396 in a second direction). In some embodiments, filling or controlling the first chamber 614*a* (e.g., controlling pressure of hydraulic fluid in the first chamber 614*a*) is referred to as operating the internal park brake ("IPR") and filling or controlling the second chamber 614*b* (e.g., controlling pressure of hydraulic fluid in the second chamber 614***b*) is referred to as operating the internal service brake ("ISB").

Referring still to FIG. 3, the gearbox 300 may include a spring 394 configured to bias a member 398 to translate in a direction such that the brake 316 is engaged. In some embodiments, the member 398 can be translated in either direction by controlling a first chamber 616*a* or a second chamber 616*b* (e.g., controlling pressurization of hydraulic fluid to the first chamber 616*a* and the second chamber 616*b*). In some embodiments, increasing pressure of the hydraulic fluid in the first chamber 616*a* causes translation of the member 398 in a first direction such that the brake 316 is engaged, while decreasing pressure of the hydraulic fluid in the first chamber 616*a* causes translation of the member 398 in a second direction such that the brake 316 is disengaged. In some embodiments, increasing pressure of the hydraulic fluid in the second chamber 616*b* cause translation of the member 398 in the second direction such that the brake 316 is disengaged, while decreasing pressure of the hydraulic fluid in the second chamber 616*b* causes translation of the member 398 in the first direction such that the brake 316 is engaged. In some embodiments, controlling pressurization of the hydraulic fluid in the first chamber 616*a* is referred to as operating the external service brake ("ESB") and controlling the pressure of the hydraulic fluid in the second chamber 616*b* is referred to as operating the external park brake ("EPR").

Figure 9:
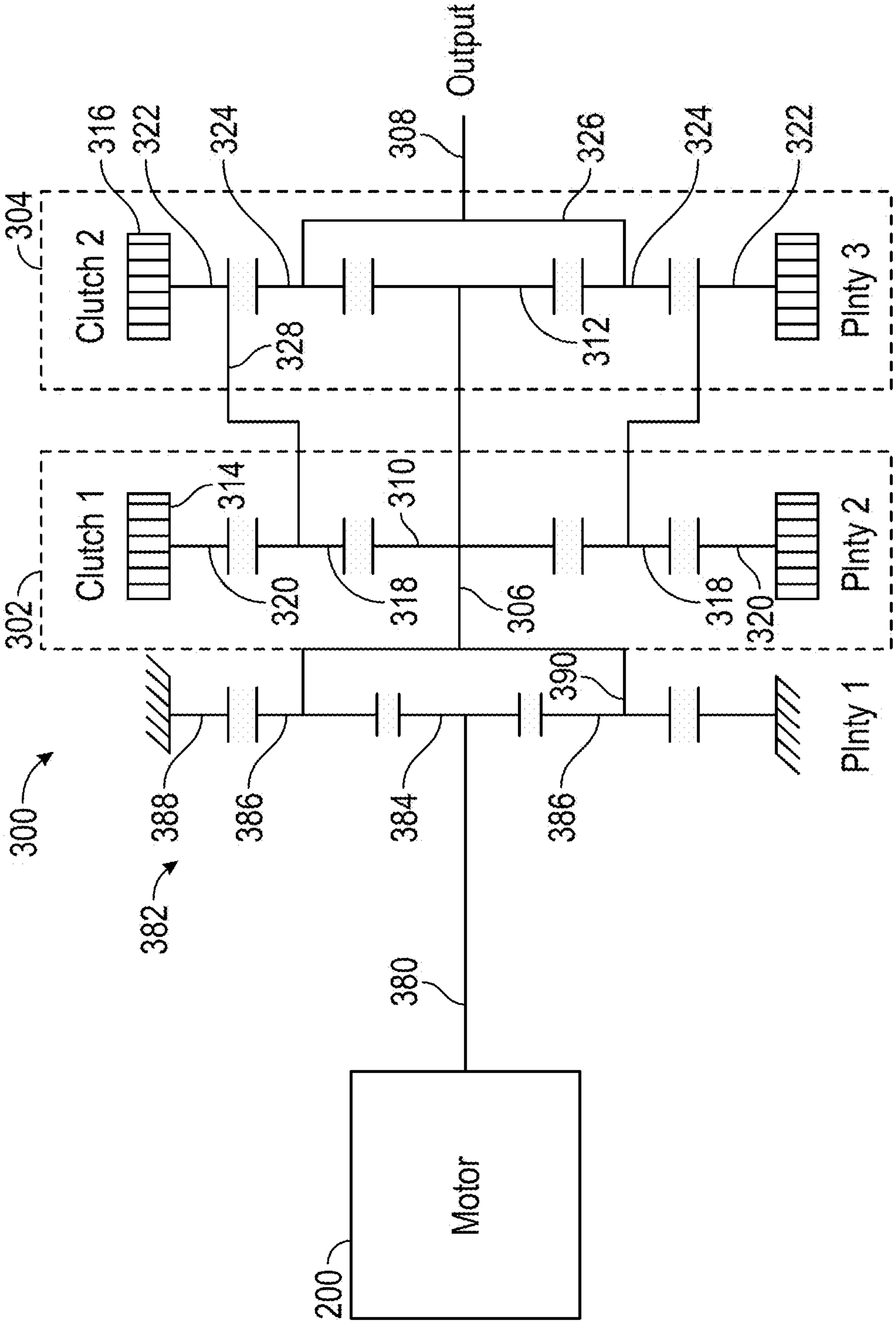
FIG. 9 is a block diagram of the gearbox of the electrical drive system of FIG. 1, according to some embodiments.

Referring to FIGS. 2 and 9, the gearbox 300 may include a third planetary gear set, shown as planetary gear set 382. The third planetary gear set 382 is positioned upstream of the first planetary gear set 302 and does not include actuatable clutches for transitioning the modes of the gearbox 300. In some embodiments, the third planetary gear set 382 includes an input shaft 380 that is driven by the motor 200, a sun gear 384 that the input shaft 380 is coupled to and drives, multiple planetary gears 386 that are driven by the sun gear 384, a ring gear 388 that is fixed and limited from rotating, and a carrier 390 that is coupled with the input shaft 306 of the first planetary gear set 302. In some embodiments, the motor 200 drives the first planetary gear set 302 and the second planetary gear set 304 through the third planetary gear set 382.

Referring to FIGS. 11-14, the drive member 400 includes a manually actuatable disconnection point. As shown in FIGS. 11-14, the drive member 400 includes a drum 402 that includes a spline along an inner surface of the drum 402. The drum 402 defines an inner volume within which the output shaft 308 extends. The output shaft 308 extends to an end of the drum 402 and includes a flange 340 that defines a spline engagement along an outer surface of the flange 340. In some embodiments, the spline engagement of the flange 340 of the output shaft 308 and the spline engagement of the inner surface of the drum 402 are configured to engage with each other in order to transfer rotational kinetic energy from the output shaft 308 to the drum 402.

The drive member 400 includes a cam plate 404 that includes a tool engagement portion 406 (e.g., a shape or geometry such that a tool can be manually coupled to the cam plate 404). The cam plate 404 includes multiple camming members or surfaces, shown as first cam 410*a*, second cam 410*b*, and third cam 410*c*. The cams 410 may have the form of slanted or angled surfaces that are arranged in a circular pattern and increase in height along the circular pattern. The cams 410 may each include a hook or a recess at an end of the cams 410 (e.g., at a tallest portion of the cams 410).

The cam plate 404 may engage, touch, press against, contact, etc., an intermediate plate 408 that engages the flange 340 of the output shaft 308. The cam plate 404 may be rotatable about a longitudinal axis 450 between a first angular position and a second angular position. When the cam plate 404 is in the first angular position, the drum 402 is engaged with the flange 340 of the output shaft 308 such that rotation of the output shaft 308 drives rotation of the drum 402. When the cam plate 404 is rotated into the second angular position (e.g., by attaching a tool to the tool engagement portion 406 and rotating the cam plate 404 about the longitudinal axis 450), the flange 340 and the output shaft 308 are driven to translate along the longitudinal axis 450 such that the flange 340 is driven out of engagement with the drum 402 (e.g., the splines of the inner surface of the drum 402 and the outer surface of the flange 340 are driven out of engagement) so that the drum 402 can freely rotate relative to the output shaft 308. Advantageously, the cam plate 404 provides a manual way to disconnect the drum 402 from the output shaft 308 and therefore from the gearbox 300 entirely. In this way, if the gearbox 300 becomes damaged or jammed, the vehicle 10 can be manually transitioned into a neutral state where the drum 402 is physically disconnected from the gearbox 300 and the vehicle 10 can be towed.

Figure 10A:
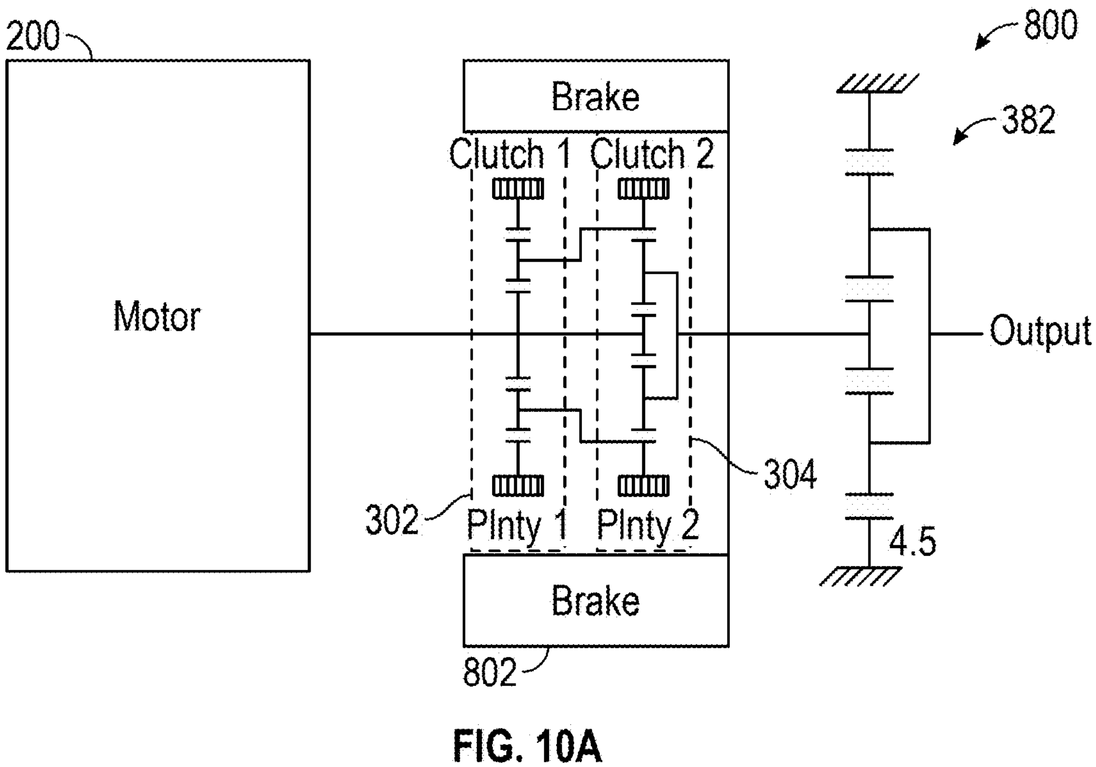
FIGS. 10A-10E are various alternative configurations of the gearbox of the electrical drive system of FIG. 1, according to some embodiments.

Referring to FIG. 10A, the gearbox 300 may be provided as gearbox 800 including the planetary gear set 382 coupled on an output of the second planetary gear set 304. In the configuration of the gearbox 300 shown as gearbox 800, the motor 200 drives the sun gears of the first gear set 302 and the second gear set 304, and the carrier of the second gear set 304 drives an input shaft of the gear set 382 (e.g., the sun gear). The gear set 382 outputs torque via the carrier of the gear set 382. The gear set 800 may also include a brake 802 that exerts a braking force in addition to or in place of braking force that is applied by the brake 314 or the brake 316 of the first planetary gear set 304 and the second planetary gear set 306. The brake 802 may be configured to exert braking force onto a shaft that couples the carrier of the second planetary gear set 304 with the input shaft of the planetary gear set 382. In some embodiments, the planetary gear set 382 has a gear ratio of 4.5.

Figure 10B:
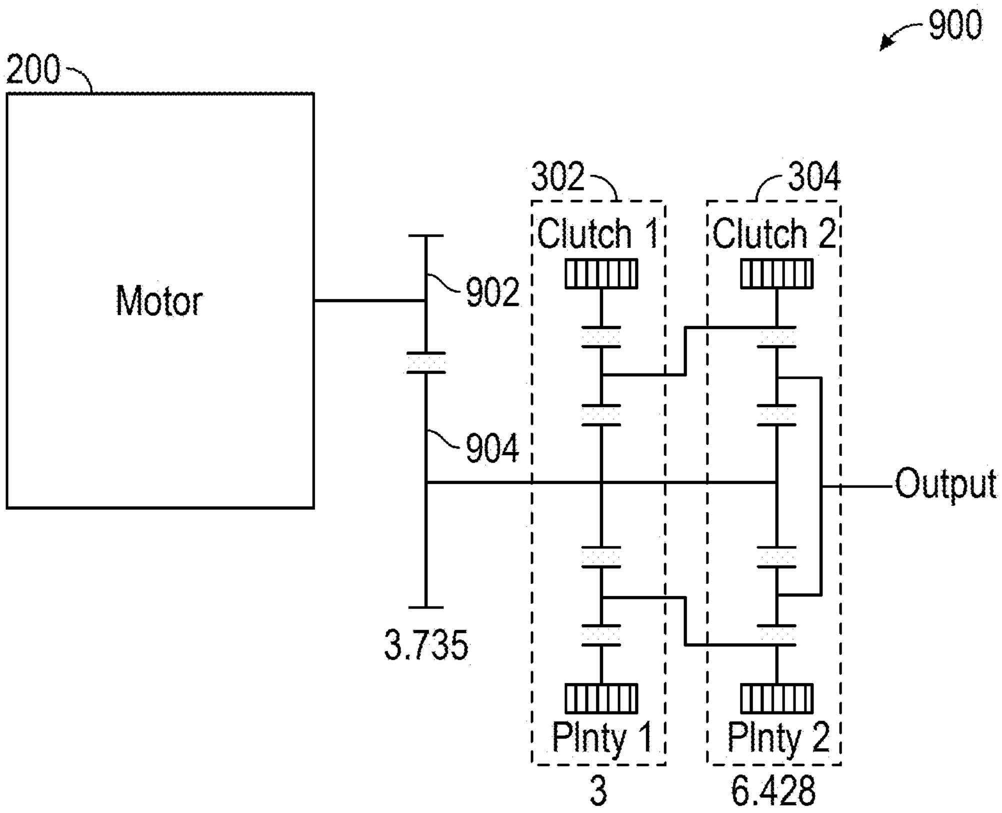

Referring to FIG. 10B, the gearbox 300 may be provided as gearbox 900 including a first gear 902 that is driven by an output shaft of the motor 200 and a second gear 904 that is driven by the first gear 902 and drives the input shaft of the first planetary gear set 302 and the second planetary gear set 304. In some embodiments, the first gear 902 and the second gear 904 can be used in place of the planetary gear set 382. In some embodiments, the second gear 904 has a greater number of teeth than the first gear 902. A gear ratio across the first gear 902 and the second gear 904 may be 3.735. A gear ratio of an input of the first planetary gear set 302 relative to an output of the first planetary gear set 302 may be 3. A gear ratio of an input of the second planetary gear set 304 relative to an output of the second planetary gear set 304 may be 6.426.

Figure 10C:
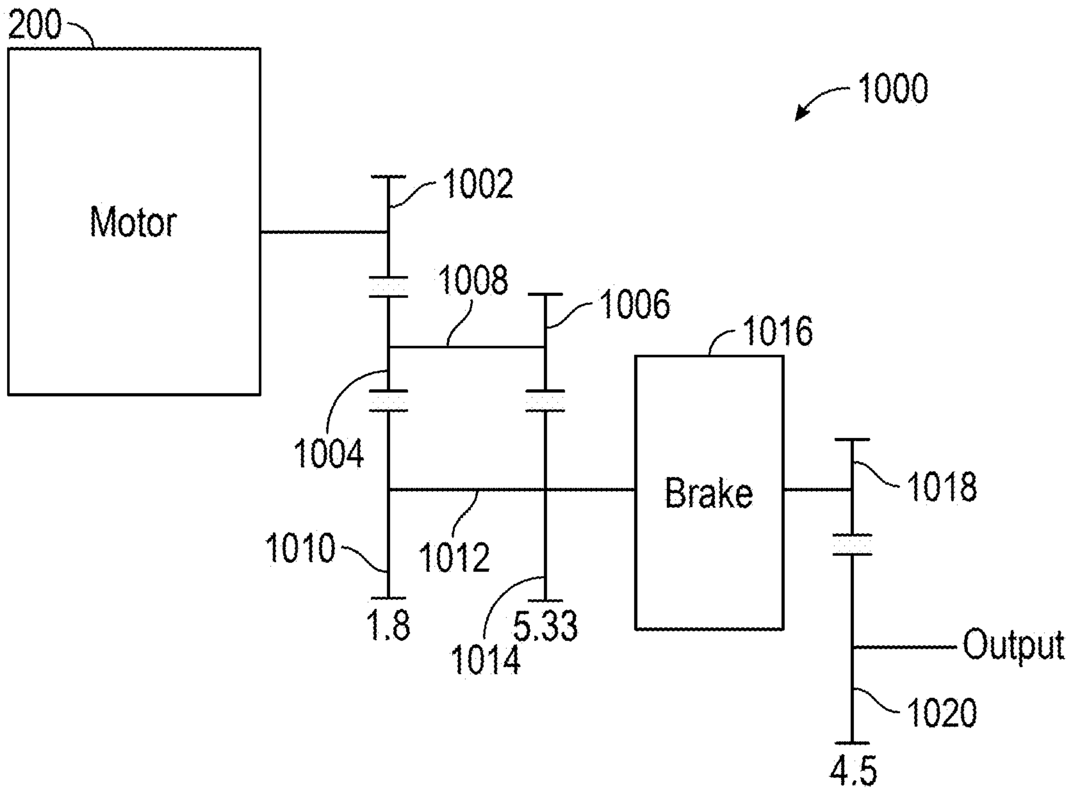

Referring to FIG. 10C, the gearbox 300 may be provided as gearbox 1000 including a drive gear 1002, a first gear 1004, a second gear 1006, a shaft connecting the first gear 1004 with the second gear 1006, a third gear 1010, a fourth gear 1014, a shaft 1012 connecting the third gear 1010 with the fourth gear 1014, a brake 1016, and a first output gear 1018 and a second output gear 1020. The motor 200 drives the drive gear 1002 which meshes with and drives the first gear 1004 and therefore also drives the second gear 1006 through the shaft 1008. The first gear 1004 meshes with the third gear 1010 and the second gear 1006 meshes with the fourth gear 1014. The third gear 1010 and the fourth gear 1014 are connected with each other via the shaft 1012 and are also connected with the first output gear 1018 through the shaft 1012. The brake 1016 is configured to apply a braking force or friction to the shaft 1012 to slow or decelerate the vehicle 10. The first output gear 1018 meshes with and drives the second output gear 1020 which drives an output shaft of the gearbox 1000.

Figure 10D:
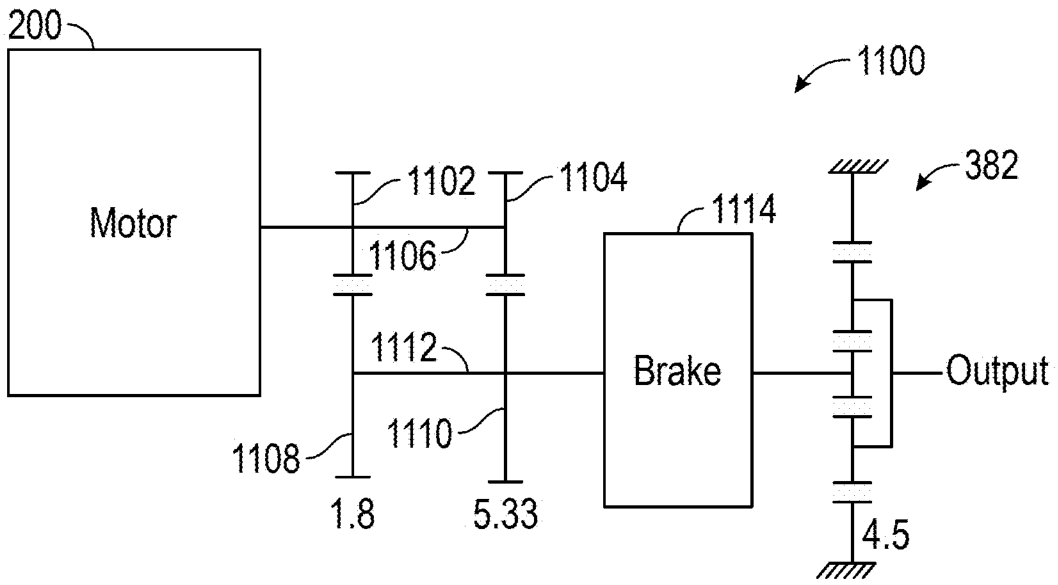

Referring to FIG. 10D, the gearbox 300 can be provided as gearbox 1100. The gearbox 1100 includes a first gear 1102 and a second gear that are both coupled on an output shaft 10106 of the motor 200. The gearbox 1100 also includes a third gear 1108 and a fourth gear 1110 that are coupled on a shaft 1112 and mesh with the first gear 1102 and the second gear 1104, respectively. The gearbox 1100 also includes a brake 1114 that is configured to exert a braking force on the shaft 1112. The gearbox 1100 includes the planetary gear set 382 that receives input torque from the shaft 1112 at the sun gear of the planetary gear set 382, and outputs torque via the carrier of the planetary gear set 382.

Figure 10E:
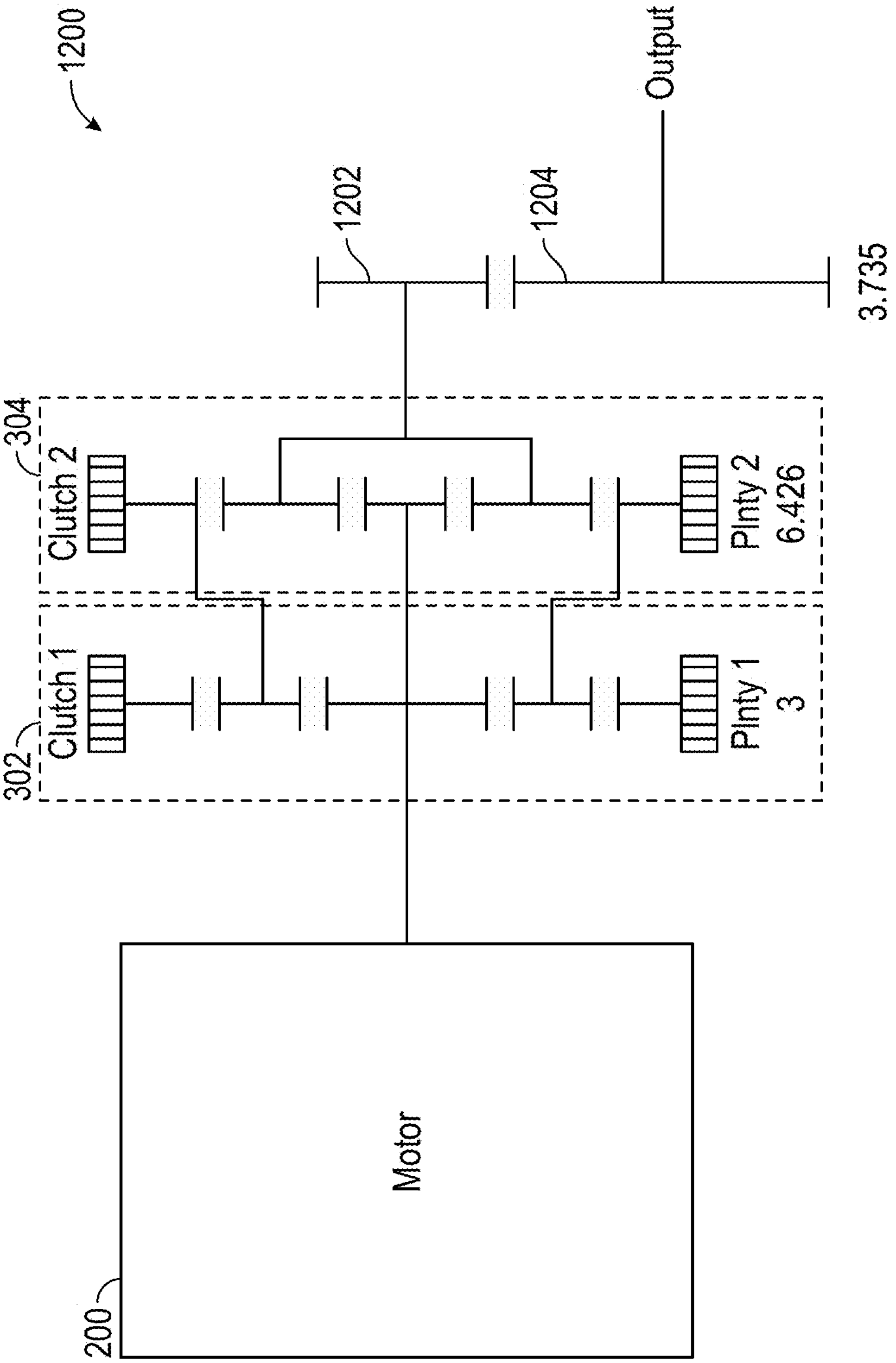

Referring to FIG. 10E, the gearbox 300 can be provided as gearbox 1200. The gearbox 1200 includes the first planetary gear set 302 and the second planetary gear set 304 which both receive input torque at their sun gears from the motor 200. The carrier of the second planetary gear set 304 drives a first output gear 1202 which meshes with a second output gear 1204. The first output gear 1202 and the second output gear 1204 may have a gear ratio of 3.735. The second output gear 1204 drives an output shaft.

Pump System

Figure 15:
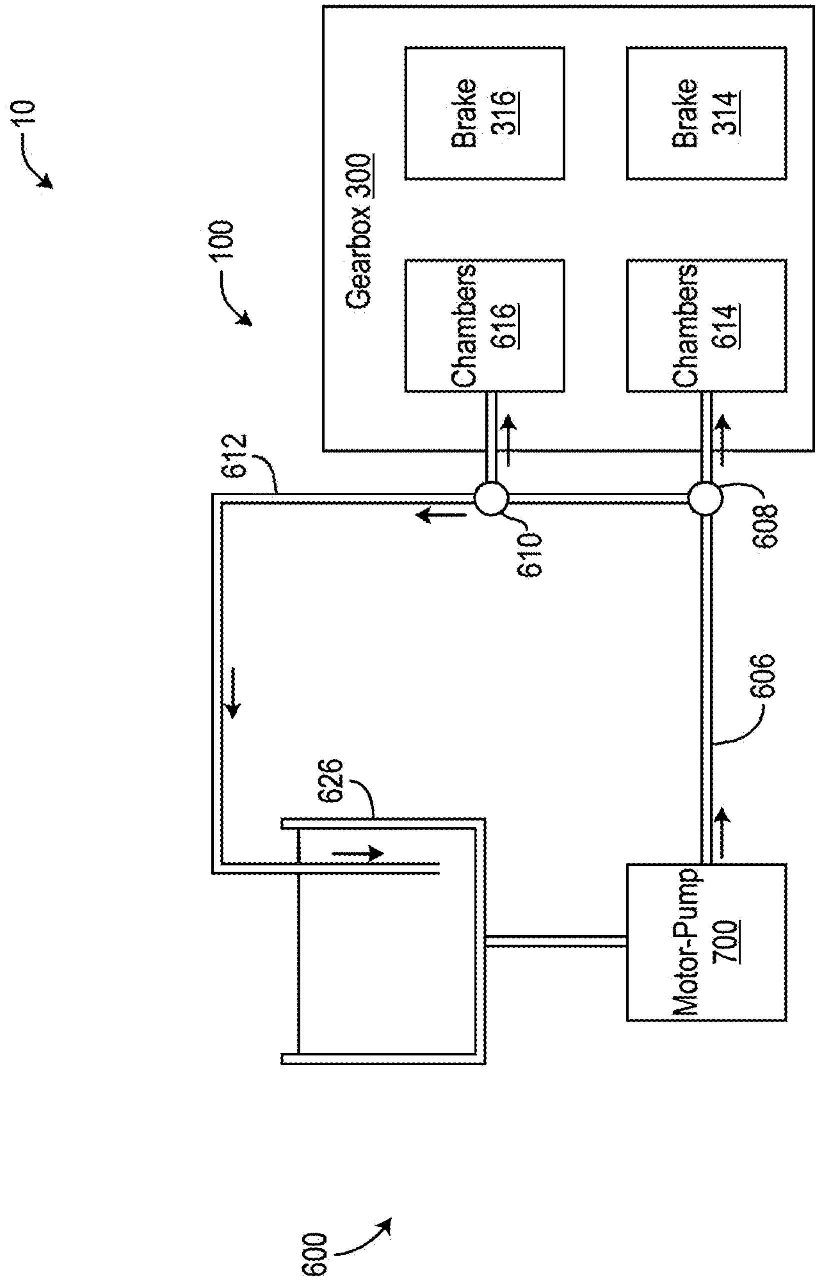
FIG. 15 is a block diagram of a pump system for the vehicle of FIG. 1, according to some embodiments.

Referring to FIG. 15, the vehicle 10 may include a hydraulic or pump system, shown as pump system 600. The pump system 600 includes a motor-pump 700, one or more conduits, lines or tubular members, shown as lines 606, one or more valves or manifolds, shown as valve 608 and valve 610, a return line 612 (e.g., a conduit, a pipe, a tubular member, etc.), and a hydraulic reservoir 626. The pump system 600 is configured to provide hydraulic fluid or pressurized fluid to one or more hydraulically actuatable or controllable components of the vehicle 10. For example, the lines 606 may be configured to provide pressurized hydraulic fluid to a chamber 614 associated with the brake 314 to transition the brake 314 between the engaged state, the disengaged state, or a partially engaged state. Similarly, the lines 606 may also be configured to provide pressurized hydraulic fluid to a chamber 616 associated with the brake 316 to transition the brake 316 between the engaged state, the disengaged state, or a partially engaged state. In some embodiments, the valves 608 and 610 are controllable to adjust a pressurization of the chambers 614 and 616 and therefore control a braking force applied by the brake 314 or the brake 316. In some embodiments, the valves 608 and 610 are electrically controllable by a controller or a control system of the vehicle 10. The motor-pump 700 may be an electrically driven pump including an electric motor. The motor-pump 700 is supplied with hydraulic fluid from the reservoir 626 (e.g., a tank, a container, a reservoir, etc.).

Referring to FIGS. 16-20, the motor-pump 700 includes an electric motor 706, an adapter plate 704, and a pump 702. The motor-pump 700 may have an overall length 708 that is substantially equal to 195 millimeters ("mm"). In some embodiments, the motor-pump 700 has an overall length 708 that is less than 200 mm. In some embodiments, the motor-pump 700 has an overall length 708 of 195.3 mm. In some embodiments, the motor-pump 700 has an overall length 708 of less than 260 mm. The motor-pump 700 may be configured to pressurize hydraulic fluid to at least 100 bar, and may consume electrical energy at 24 volts. In some embodiments, the electric motor 706 uses direct current ("DC") electrical energy at 24 volts. The motor-pump 700 may also be configured to provide discharge of hydraulic fluid or oil at a rate of at least 3 liters per minute ("lpm"). In some embodiments, the motor-pump 700 is configured to provide discharge of hydraulic fluid or oil at a rate of at least 3 lpm.

Figure 16:
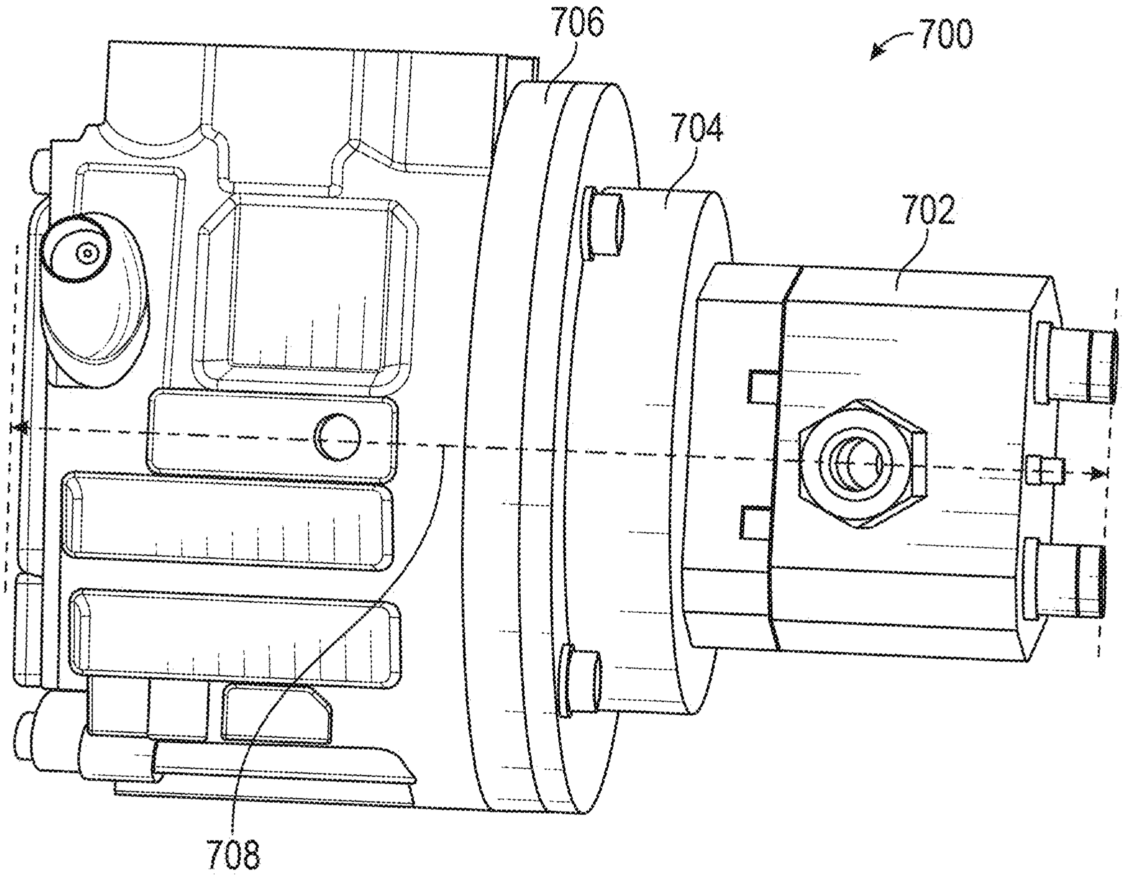
FIG. 16 is a perspective view of a high pressure pump of the pump system of FIG. 15, according to some embodiments.

Referring particularly to FIG. 16, the electric motor 706 is coupled with the pump 702 through the adapter plate 704. The adapter plate 704 may be a structural member that includes structure so that the electric motor 706 is configured to drive a driveshaft of the pump 702.

Figure 17:
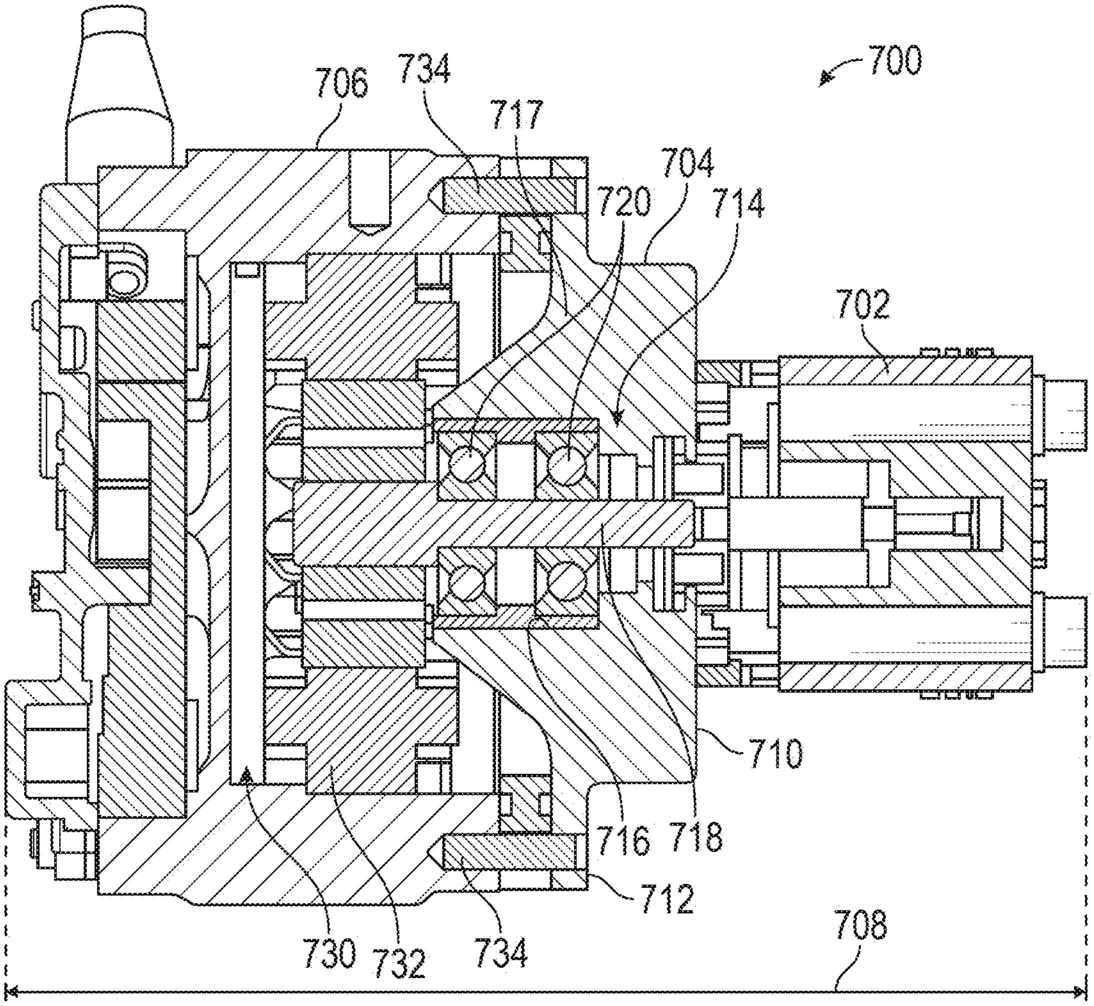
FIG. 17 is a sectional view of the high pressure pump of FIG. 16, according to some embodiments.

Referring particularly to FIG. 17, the electric motor 706 may be coupled with a driveshaft 718 of the pump 706. The driveshaft 718 extends through an opening 714 in the adapter plate 704 and couples, at an opposite end of the pump 702, with one or more motor components (e.g., a rotor) of the motor 706. The motor components 732 are positioned within an inner volume 730 of the motor 706. The adapter plate 704 includes a hub portion 710, a flange 712 that extends outwards from the hub portion 710, and a frustoconical portion 717 (e.g., a second hub portion, a second central portion, etc.). The opening 714 of the adapter plate 704 extends centrally through the hub portion 710 and the frustoconical portion 717 and defines an opening or channel through which the drive shaft 718 extends. In some embodiments, the opening 714 and the frustoconical portion 717 define an inner surface 716 (e.g., a circular surface, a surface of a bore, etc.) for receiving one or more bearings 720 (e.g., outer races of the bearings 720) of the motor-pump 700. The bearings 720 may be press fit into the inner surface 716. The drive shaft 718 extends through the bearings 720 and couples with an inner surface of an inner race of the bearings 720.

Referring particularly to FIGS. 17-20, the motor-pump 700 may include pins 734 that extend through openings in the flange 712 and extend into corresponding openings in the housing or structural portion of the motor 706. The pins 734 facilitate securing the adapter plate 704 with the housing of the motor 706 such that the motor 706 can drive the driveshaft 718 to rotate and thereby drive the pump 702 to pressurize fluid. The pins 734 may extend through openings 736 in the flange 712. In some embodiments, the motor-pump 700 includes a pair of two pins 734.

Figure 18:
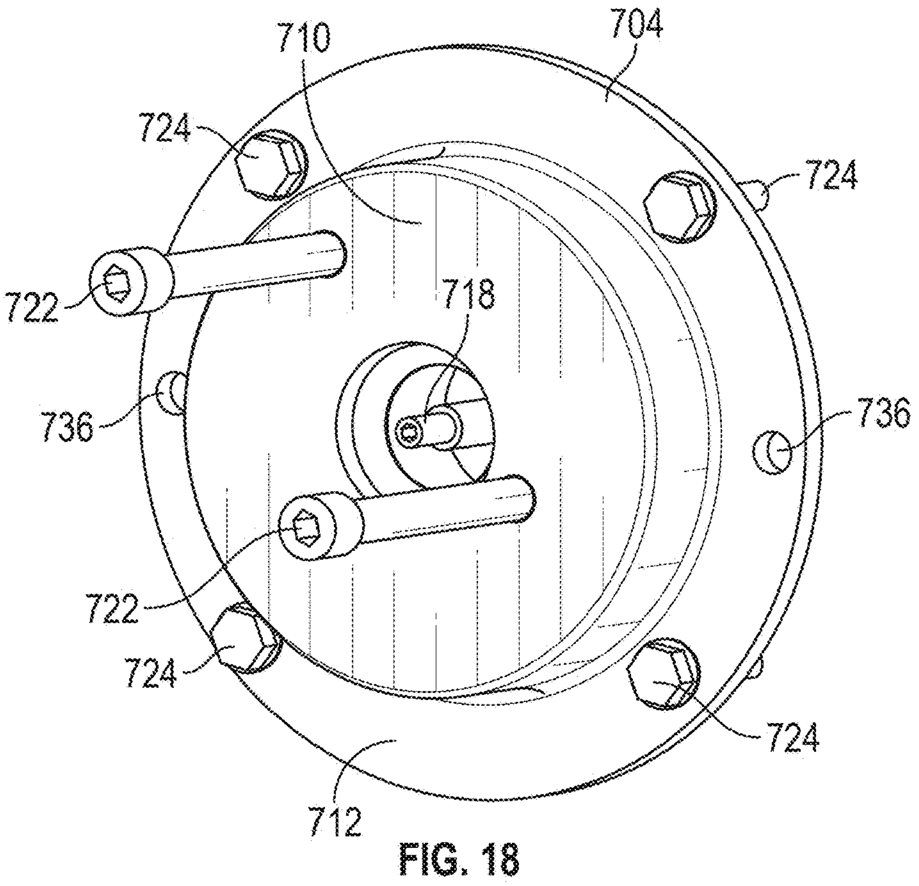
FIG. 18 is a first perspective view of an adapter plate of the high pressure pump of FIG. 15, according to some embodiments.
Figure 19:
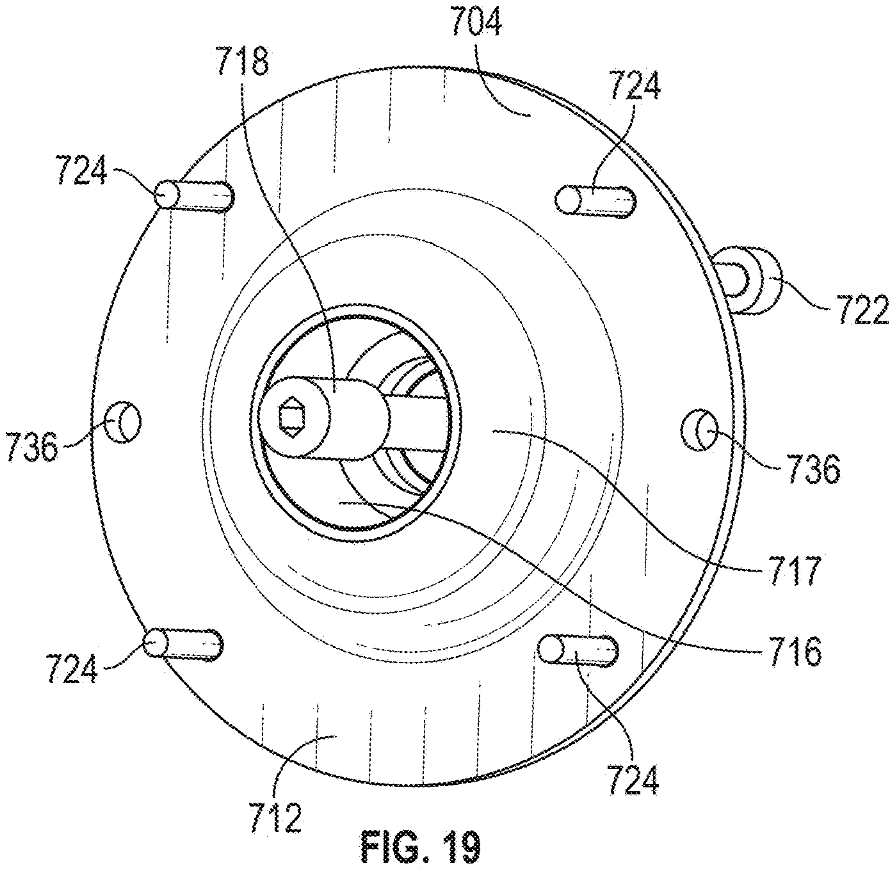
FIG. 19 is a second perspective view of the adapter plate of FIG. 18, according to some embodiments.
Figure 20:
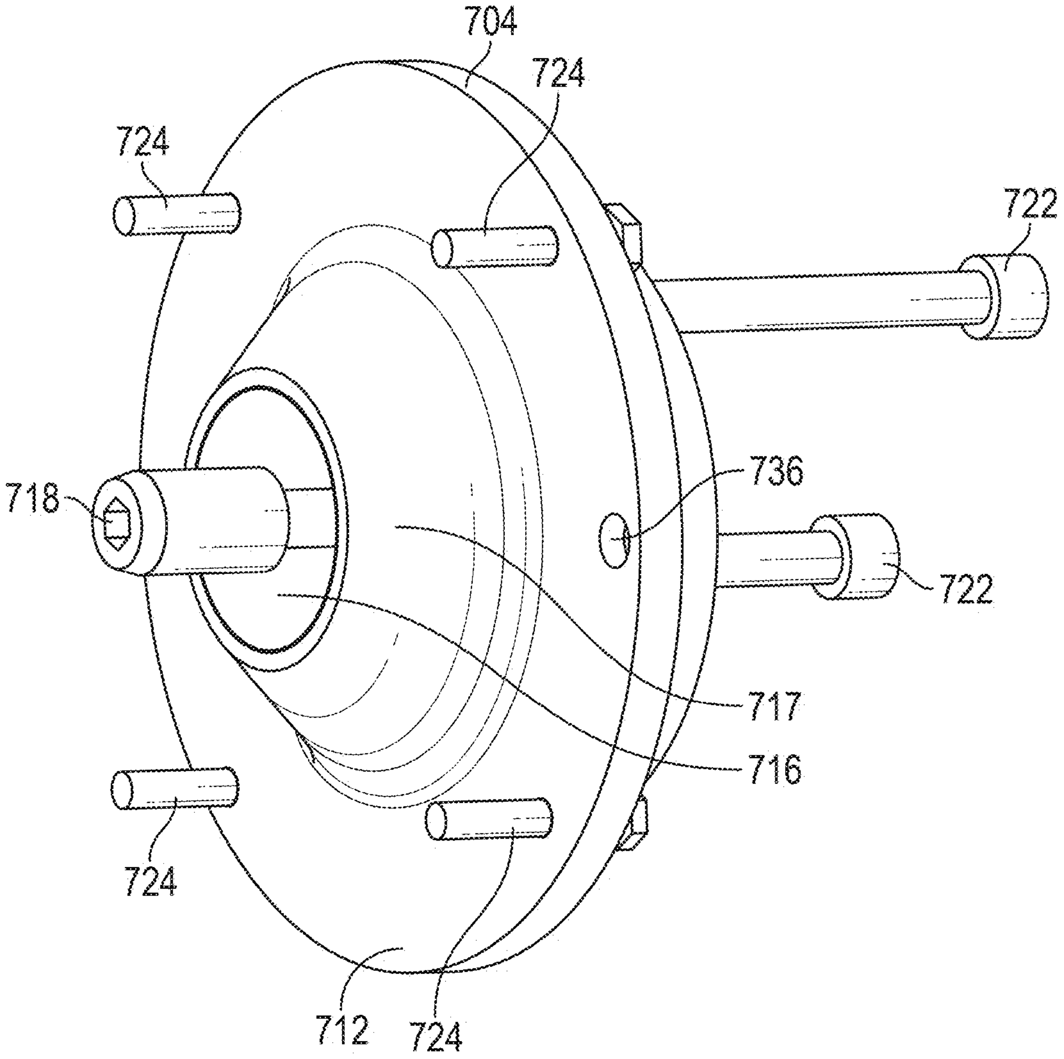
FIG. 20 is a third perspective view of the adapter plate of FIG. 18, according to some embodiments.

Referring to FIGS. 18-20, the motor-pump 700 includes first fasteners 724 that extend from the hub 710 side of the flange 712 to the frustoconical portion 717 side of the flange 712. The first fasteners 724 extend through the flange 712 and are configured to threadingly couple with the housing of the motor 706 to secure the adapter plate 704 on the motor 706. The motor-pump 700 also includes second fasteners 722 that extend through the hub portion 710 and threadingly couple with the pump 702. In some embodiments, the fasteners 722 include two fasteners.

In some embodiments, the motor-pump 700 is a 24 volt DC brushless oil pump assembly including a gear pump. The motor-pump 700 may be assembled by removing a pump portion and pump driveshaft to be removed out of a motor armature of an existing or off the shelf motor-pump. The driveshaft 718 (e.g., a new, reduced length driveshaft) may then be pressed into the armature of the motor 706 in the same position. The bearing collar and ball bearings may be removed from the pump 702 and installed onto the adapter plate 704. The motor armature and driveshaft assembly may then be reinstalled onto the motor 706. After this is completed, the adapter plate 704 may be aligned with the pins 734 of the motor 706 and the fasteners 724 can be installed.

A tang of the pump 702 may then be aligned with a slot in the driveshaft 718 so that the pump 702 can be seated onto the adapter plate 704. The housing of the pump 702 may be aligned with the two threaded openings (e.g., for the fasteners 722) and the fasteners 722 can be installed. Advantageously, the driveshaft 718 and the adapter plate 704 facilitate a reduced length motor-pump 700 which facilitates packaging flexibility and reduced weight.

Figure 21:
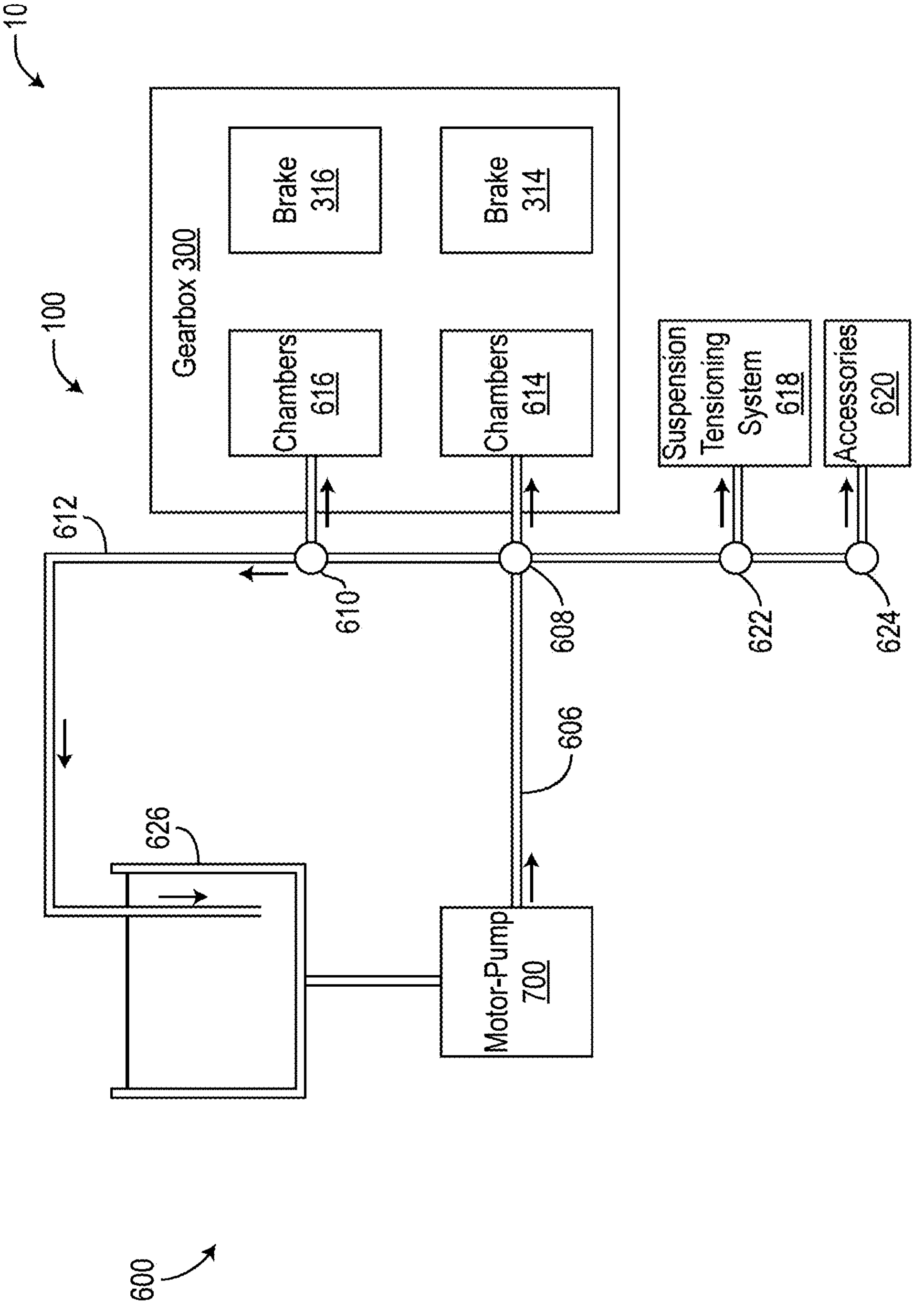
FIG. 21 is a block diagram of the pump system of FIG. 15, according to some embodiments.

Referring to FIG. 21, the pump system 600 may include a suspension tensioning system 618 and one or more accessories of the vehicle 10 that receive pressurized hydraulic fluid or oil from the motor-pump 700 through the lines 606 and corresponding valves 622 and 624. In some embodiments, the motor-pump 700 is configured to provide pressurized hydraulic fluid to the suspension tensioning system 618 to adjust a stiffness or ride height of one or more suspension elements of the vehicle 10. In some embodiments, the accessories 620 include various actuators, body actuators, turret control members, etc. The motor-pump 700 may be capable of providing sufficient pressurization and volumetric flow rate of the hydraulic fluid or the oil for the chamber 616, the chamber 614, the suspension tensioning system 618, and the accessories 620 while having the overall length 708 of less than 200 mm.

Control System

Figure 22:
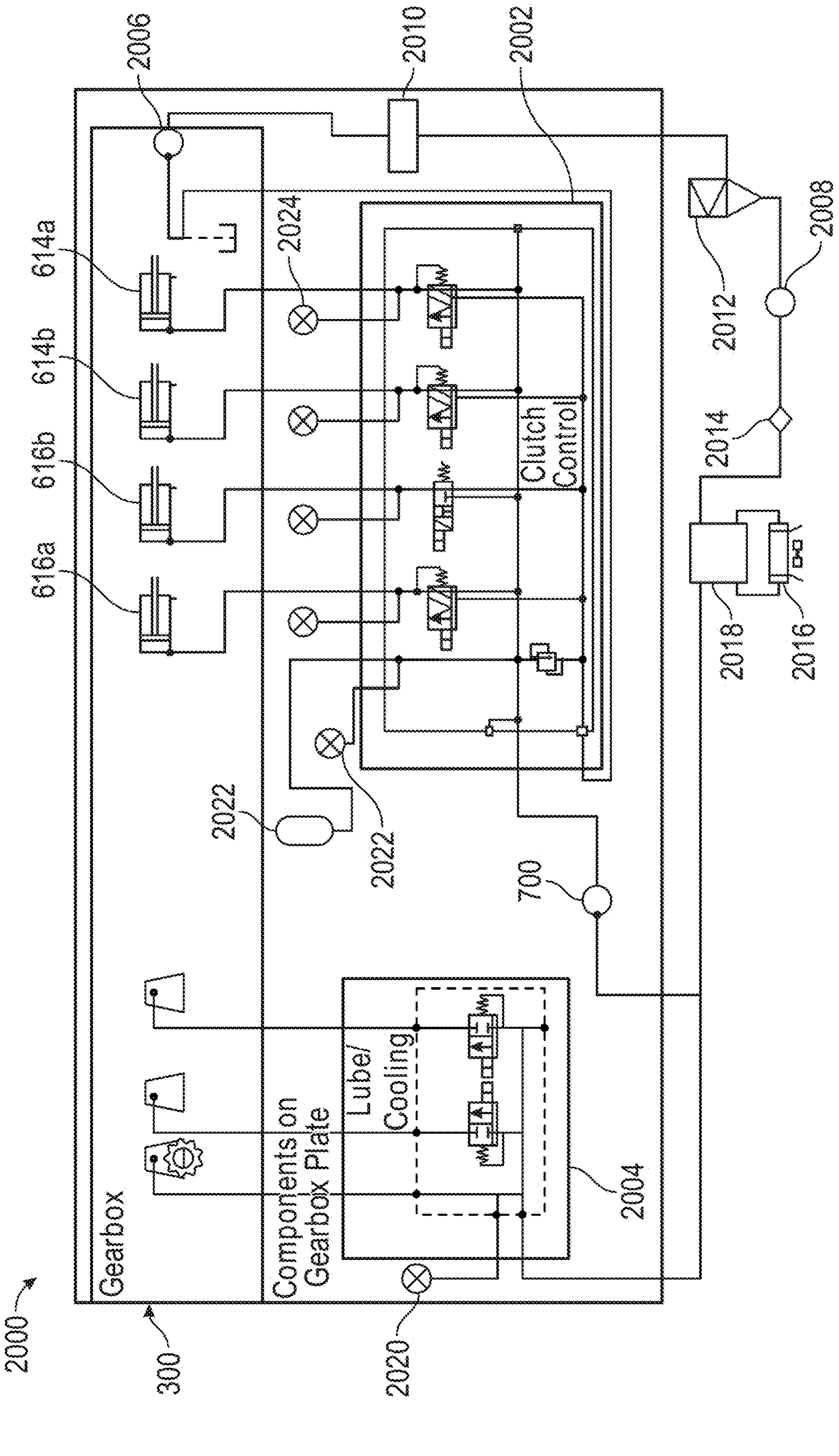
FIG. 22 is a hydraulic schematic of a hydraulic system for operating the gearbox of FIG. 3, according to some embodiments.

Referring to FIG. 22, a system 2000 for controlling the gearbox 300 includes the gearbox 300, and one or more components that may be mounted on a plate of the gearbox 300. The system 2000 includes the gearbox 300, a clutch control unit 2002 for controlling the clutches 314 and 316 of the gearbox 300, a lubrication/cooling control unit 2004, a scavenge oil pump 2006, a low pressure pump 2008, a high pressure pump (e.g., pump 700), an oil temperature sensor sump 2010 (e.g., a temperature sensor configured to measure a temperature of oil or hydraulic fluid returned from the brake 314 or the brake 316), an oil reservoir 2012 including one or more temperature sensors and integral level, a filter 2014, a cooler 2016 that uses air to cool the oil or hydraulic fluid, a thermostat controller 2018, a pressure sensor 2020, a high pressure accumulator 2022, the ESB, shown as chamber 616*a*, the EPR, shown as chamber 616*b*, the ISB, shown as chamber 614*b*, the IPR, shown as chamber 614*a*, a pressure sensor accumulator 2022, and one or more pressure sensors 2024 that are configured to measure pressure of the corresponding chamber 616*a*, chamber 616*b*, chamber 614*a*, and chamber 614*b* (e.g., a brake status of the brake 314 and the brake 316). As described in greater detail above with reference to the structure of the gearbox 300, the gearbox 300 may include, as a safety feature, one or more springs that apply to the brake 314 and the brake 316 such that, if hydraulic failure occurs, the gearbox 300 automatically transitions into the park mode.

Referring still to FIG. 22, the clutch control unit 2002 is supplied with oil or hydraulic fluid by the pump 700 which is directed to the chamber 616*a*, the chamber 616*b*, the chamber 614*a*, and the chamber 614*b* by four corresponding solenoids in order to control operation of the gearbox 300 by activating or de-activating the brake 314 and the brake 316 (e.g., fully disengaging or engaging, or partially engaging to perform braking). In some embodiments, the gearbox 300 is transitioned into the low range (e.g., the low range mode of operation) by providing hydraulic fluid or oil to, and thereby pressurizing, the chamber 616*a*, the chamber 616*b*, and the chamber 614*a*. Braking in the low range mode can be achieved by releasing pressure of the chamber 614*a* and applying variable pressure to the chamber 614*b*. In some embodiments, an amount of the variable pressure applied to the chamber 614*b* results in corresponding deceleration or braking of the vehicle 10.

In some embodiments, the gearbox 300 can be transitioned into the high range mode by pressurizing the chamber 616*b* and the chamber 614*b*. Braking events while operating in the high range mode can be achieved by providing variable pressure to the chamber 616*a* responsive to an amount of braking or deceleration requested by an operator of the vehicle 10. In some embodiments, shifting between the high and the low range modes of operation of the gearbox 300 can be achieved by applying or releasing pressure of the chamber 616*a*, 616*b*, 614*a*, or 614*b* according to the high range and low range mode to transition the gearbox 300 between the high range mode and the low range mode. In some embodiments, the gearbox 300 is limited from transitioning between the high range mode and the low range mode if the vehicle 10 is traveling at a speed greater than a threshold amount in order to protect the motor 200 from over speeding. In some embodiments, emergency braking can be performed while the gearbox 300 operates in either the high range mode or the low range mode by releasing all of the pressure to the chamber 616*a*, the chamber 616*b*, the chamber 614*a*, and the chamber 614*b*. Releasing the pressure to the chambers 614 and the chamber 616 results in both the brake 314 and the brake 316 being transitioned into the fully engaged state (e.g., by the springs) to thereby halt the vehicle 10.

Figure 23:
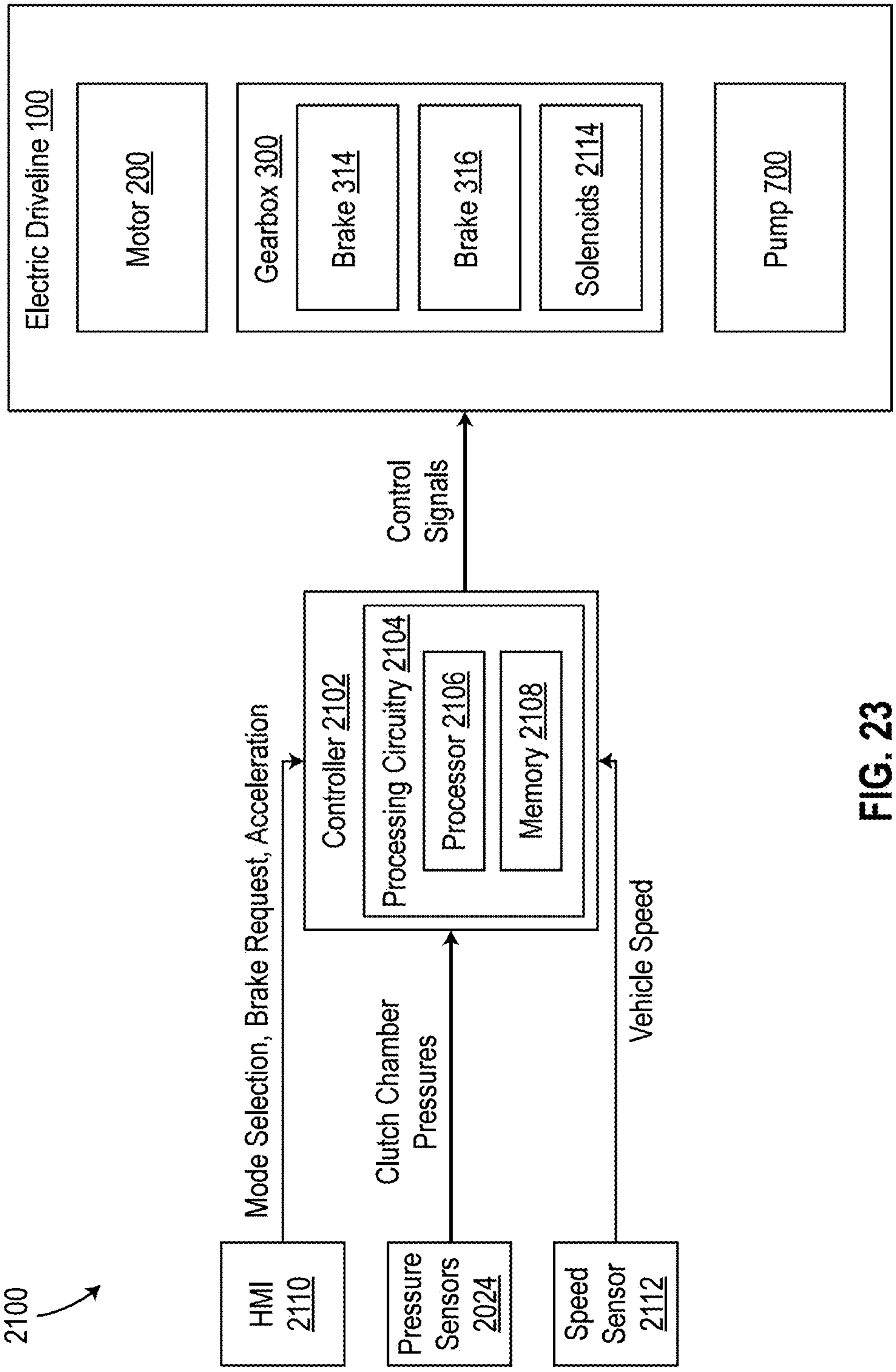
FIG. 23 is a block diagram of a control system for controlling the electric driveline of FIG. 1, according to some embodiments.

Referring to FIG. 23, a control system 2100 for the electric driveline 100 of the vehicle 10 includes a controller 2102, a human machine interface ("HMI") 2110 (e.g., an accelerator pedal, a brake pedal, a steering wheel, a user interface, a gear or mode selector, a shifter, etc.), the pressures sensors 2024, a speed sensor 2112, and the electric driveline 100. The speed sensor 2112 is configured to measure a speed of the vehicle 10 such that the controller 2102 can either allow or limit transition of the driveline 100 and the gearbox 300 based on the vehicle speed compared to a threshold. For example, the control system 2100 may limit transitioning of the gearbox 300 into the park mode or state until the speed sensor 2112 indicates that the vehicle 10 is no longer moving or that the speed is sufficiently low. In some embodiments, the operator of the vehicle 10 can provide a mode selection, a brake request, and an acceleration request to the controller 2102 via the HMI 2110. It should be understood that the operator of the vehicle 10 may be in a remote position and can provide the various control inputs via the HMI 2100 in a remote manner such that the vehicle 10 operates without an on-board operator. In some embodiments, the operator is an on-board operator or driver and operates an HMI 2110 to provide control inputs at a passenger location of the vehicle 10.

Referring still to FIG. 23, the controller 2102 is configured to receive measurements of pressure within the chambers 614 and the chambers 616 from the pressure sensors 2024. The controller 2102 can use the pressure provided by the pressure sensors 2024, a currently selected mode, and the brake requests in order to determine appropriate pressurizations of the chamber 614 and the chamber 616 to achieve the brake requests. In some embodiments, the controller 2102 is configured to implement a closed-loop control scheme and uses the pressure provided by the pressure sensors 2024 as feedback in order to determine adjustments to the variable pressurization of one or more of the chamber 614 or the chamber 616 in order to achieve the brake request. The controller 2102 may also use the vehicle speed as feedback to determine adjustments of the variable pressurization of the chambers 614 and the chamber 616 in order to achieve the brake request. In some embodiments, the controller 2102 is configured to provide control signals to the motor 200, the gearbox 300 (e.g., the brake 314 and the brake 316 by providing control signals to solenoids 2114 that adjust pressurization or variable pressurization of the chambers 614 and the chambers 616). In some embodiments, the controller 2102 is also configured to provide control signals to the pump 700 or any of the components of the system 2000 as described in greater detail above with reference to FIG. 20. In some embodiments, the controller 2102 is configured to increase torque or speed output of the motor 200 according to the acceleration provided by the operator via the HMI 2110. In some embodiments, the controller 2102 is configured to operate the brake 314 and the brake 316 to engage or disengage in order to transition the vehicle 10, the electric driveline 100, and/or the gearbox 300 between different modes including a park mode in which both the brake 314 and the brake 316 are engaged, a neutral mode in which both the brake 314 and the brake 316 are disengaged, a first driving mode (e.g., a high mode) in which a first of the brake 314 and the brake 316 is engaged and the other is disengaged and used for braking, and a second driving mode (e.g., a low mode) in which a second the brake 314 and the brake 316 is engaged and the other is disengaged and used for braking.

Referring still to FIG. 23, the controller 2102 is shown to include a circuit, shown as processing circuitry 2104, a processor, shown as processor 2106, and memory, shown as memory 20108, according to some embodiments. Controller 2102 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. Processing circuitry 2104 may include an ASIC, one or more FPGAs, a DSP, circuits containing one or more processing components, circuitry for supporting a microprocessor, a group of processing components, or other suitable electronic processing components (e.g., processor 2106). In some embodiments, processing circuitry 2104 is configured to execute computer code stored in memory 2108 to facilitate the activities described herein. Memory 2108 may be any volatile or non-volatile computer-readable storage medium capable of storing data or computer code relating to the activities described herein. According to an exemplary embodiment, memory 2108 includes computer code modules (e.g., executable code, object code, source code, script code, machine code, etc.) configured for execution by processing circuitry 2104. Memory 2108 includes various actuation profiles corresponding to modes of operation (e.g., for the gearbox 300, according to an exemplary embodiment. In some embodiments, controller 2102 may represent a collection of processing devices (e.g., servers, data centers, etc.). In such cases, processing circuitry 2104 represents the collective processors of the devices, and memory 304 represents the collective storage devices of the devices.

Figure 24:
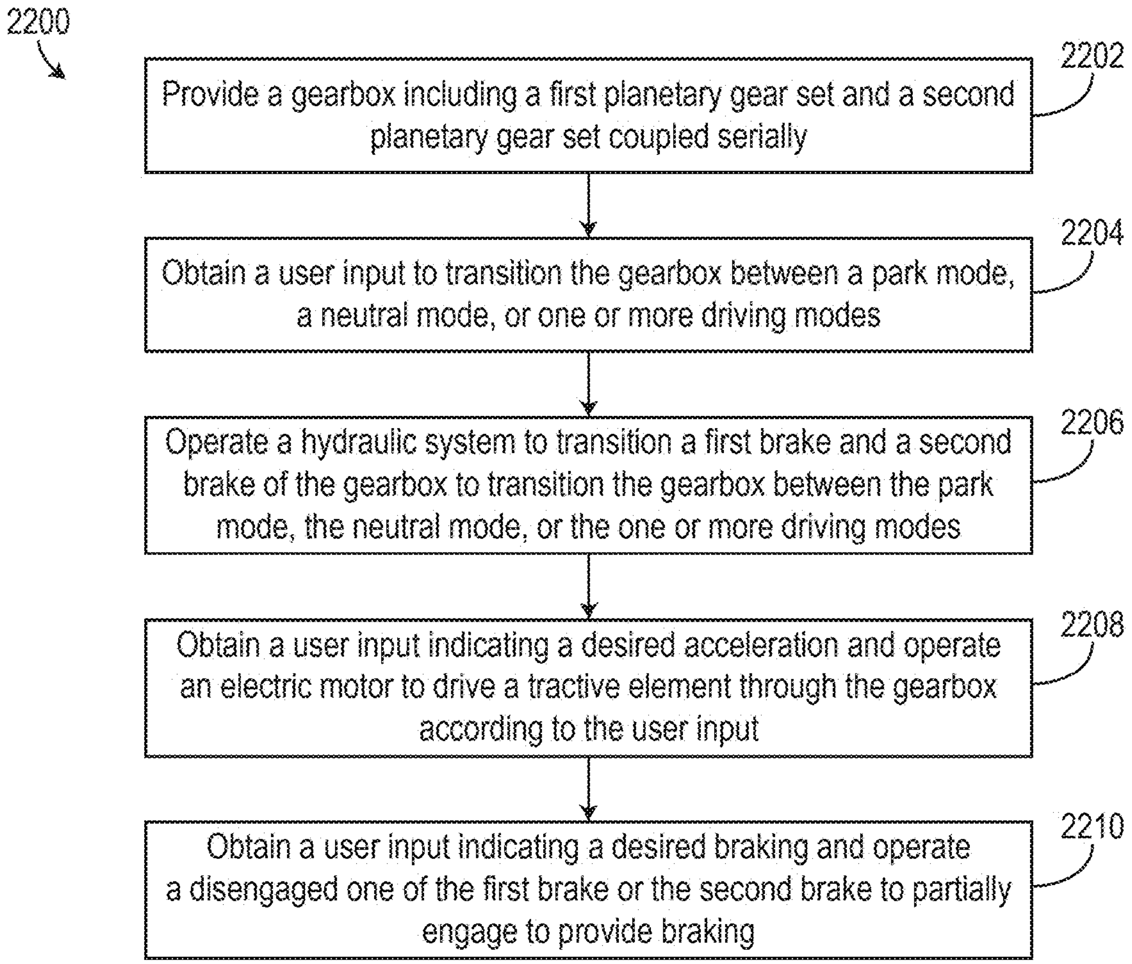
FIG. 24 is a flow diagram of a process for operating a gearbox to function as both a transmission and to provide braking, according to some embodiments.

Referring to FIG. 24, a flow diagram of a process 2200 for operating a driveline to transport a tracked vehicle (e.g., a tracked electric military vehicle) includes steps 2202-2210, according to some embodiments. The process 2200 may be performed by the control system 2100. The process 2200 advantageously operates the gearbox 300 to perform driving and braking operations, or to transition the gearbox 300 between different modes of operation (e.g., a park mode, a neutral mode, a high range or first driving mode, and a low range or second driving mode).

The process 2200 includes providing a gearbox including a first planetary gear set and a second planetary gear set coupled serially (step 2202), according to some embodiments. The gearbox may be the gearbox 300 provided as a component of a driveline (e.g., driveline 100). The first planetary gear set may be the first planetary gear set 302. The second planetary gear set may be the second planetary gear set 304. The first planetary gear set and the second planetary gear set can both be coupled with an input shaft of the gearbox at their sun gears. The input shaft may be driven by an electric motor. The gearbox advantageously functions as both a transmission and a brake in order to provide different gears and braking operations for a tracked vehicle.

The process 2200 includes obtaining a user input to transition the gearbox between a park mode, a neutral mode, or one or more driving modes (step 2204), according to some embodiments. In some embodiments, step 2204 is performed by obtaining, at the controller 2102, the user input from the HMI 2110.

The process 2200 also includes operating a hydraulic system to transition a first brake and a second brake of the gearbox to transition the gearbox between the park mode, the neutral mode, or the one or more driving modes (step 2206), according to some embodiments. Step 2206 may be performed by the controller 2102 by operating the pump 700 and solenoids 2114 to cause the first brake (e.g., the brake 314) and the second brake (e.g., the brake 316) to transition between engaged or disengaged states to transition between the park mode, the neutral mode, or the one or more driving modes. When both the first brake and the second brake are in the disengaged state, the gearbox is in the neutral mode. When both the first brake and the second brake are in the engaged state, the gearbox is in the park mode. Engaging one of the first brake or the second brake, and disengaging the other of the first brake or the second brake transitions the gearbox into one of the driving modes.

The process 2200 includes obtaining a user input indicating a desired acceleration and operating an electric motor to drive a tractive element through the gearbox according to the user input (step 2208), according to some embodiments. In some embodiments, step 2208 is performed by operating the motor 200. In some embodiments, step 2208 is performed only when the gearbox is in one of the driving modes.

The process 2200 includes obtaining a user input indicating a desired braking and operating a disengaged one of the first brake or the second brake to partially engage to provide braking (step 2210), according to some embodiments. In some embodiments, step 2210 is performed by the controller 2102 by obtaining a user input responsive to operation of a brake pedal. The brake pedal may indicate a desired amount of braking. The controller 2102 is configured to operate the pump 700 and the solenoids 2114 to pressurize a corresponding one of the first brake or the second brake to transition partially into the engaged state to provide braking. In some embodiments, step 2210 is performed by the controller 2102 based on real-time feedback from pressure sensors 2024 and speed sensor 2112 to determine a required amount of pressurization and therefore braking force to achieve the desired amount of braking. Step 2210 may only be performed when the gearbox 300 is in one of the driving modes.

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 as shown in the various exemplary embodiments is illustrative only. Additionally, any element disclosed in one embodiment may be incorporated or utilized with any other embodiment disclosed herein.

What is claimed is:

1. An electric drive train for a military vehicle, the electric drive train comprising:

an electric motor;

a gearbox configured to be driven by the electric motor and drive a tractive element of the military vehicle, the gearbox comprising:

an input shaft configured to receive torque from the electric motor;

an output shaft configured to output torque to the tractive element;

a first planetary gear set and a second planetary gear set; and a first clutch and a second clutch, wherein the first clutch is operable to engage an element of the first planetary gear set and the second clutch is operable to engage an element of the second planetary gear set, wherein the first clutch and the second clutch comprise differently sized clutch pads; and a controller configured to:

operate the gearbox according to a park mode by controlling the first clutch to be engaged with the element of the first planetary gear set and controlling the second clutch to be engaged with the element of the second planetary gear set;

operate the gearbox according to a first driving mode by controlling the first clutch to be engaged with the element of the first planetary gear set and the second clutch to be disengaged from the element of the second planetary gear set such that the electric motor is coupled with the tractive element;

operate the second clutch to partially engage the element of the second planetary gear set such that the second clutch selectively applies braking to decelerate the military vehicle in the first driving mode;

operate the gearbox according to a second driving mode by controlling the first clutch to be disengaged from the element of the first planetary gear set and the second clutch to be engaged with the element of the second planetary gear set such that the electric motor is coupled with the tractive element; and operate the first clutch to partially engage the element of the first planetary gear set such that the first clutch selectively applies braking to decelerate the military vehicle in the first driving mode.

2. The electric drive train of claim 1, wherein the first planetary gear set comprises a first sun gear, a plurality of first planet gears, a first ring gear, and a first carrier, wherein the first clutch is operable to engage the first ring gear.

3. The electric drive train of claim 2, wherein the second planetary gear set comprises a second sun gear, a plurality of second planet gears, a second ring gear, and a second carrier, wherein the second clutch is operable to engage the second ring gear.

4. The electric drive train of claim 3, wherein the first carrier is coupled with the second ring gear such that rotation of the first carrier drives rotation of the second ring gear.

5. The electric drive train of claim 3, wherein the output shaft of the gearbox is coupled with and driven by the second carrier.

6. The electric drive train of claim 1, wherein the controller is configured to operate the gearbox in the park mode by operating the first clutch and the second clutch into an engaged state to engage a first ring gear of the first planetary gear set and a second ring gear of the second planetary gear set to limit rotation of the output shaft;

wherein the controller is configured to operate the gearbox in a neutral mode of operation by operating the first clutch and the second clutch to both transition into a disengaged state to allow rotation of the first ring gear and the second ring gear and allow rotation of the output shaft.

7. The electric drive train of claim 1, wherein the controller is configured to operate the gearbox in the first driving mode by transitioning the first clutch into an engaged state and the second clutch into a disengaged state, wherein the gearbox is configured to transfer torque from the electric motor to the output shaft while operating according to the first driving mode to transport the military vehicle, and the controller is configured to transition the second clutch into a partially engaged state to provide a braking force to a ring gear of the second planetary gear set and perform a braking operation to decelerate the military vehicle; and wherein the controller is configured to operate the gearbox in the second driving mode by transitioning the second clutch into the engaged state and the first clutch into the disengaged state, wherein the gearbox is configured to transfer torque from the electric motor to the output shaft while operating according to the second driving mode to transport the military vehicle, and the controller is configured to transition the first clutch into a partially engaged state to provide a braking force to a ring gear of the first planetary gear set and perform a braking operation for the military vehicle.

8. The electric drive train of claim 1, wherein the controller is configured to operate the gearbox in the park mode by transitioning both the first clutch and the second clutch into an engaged state such that rotation of the output shaft is limited;

wherein the controller is configured to operate the gearbox in a neutral mode by transitioning both the first clutch and the second clutch into a disengaged state such that rotation of the output shaft is de-coupled from rotation of the input shaft;

wherein the controller is configured to operate the gearbox in the first driving mode by transitioning the first clutch into the engaged state such that torque is transferred from the input shaft to the output shaft through the first planetary gear set, wherein in the first driving mode, the second clutch is configured to partially transition into the engaged state to provide braking for the military vehicle;

wherein the controller is configured to operate the gearbox in the second driving mode by transitioning the second clutch into the engaged state such that torque is transferred from the input shaft to the output shaft through the second planetary gear set, wherein in the second driving mode, the first clutch is configured to partially transition into the engaged state to provide braking for the military vehicle; and wherein the first planetary gear set and the second planetary gear set comprise different gear ratios such that the first driving mode is a high mode and the second driving mode is a low mode.

9. An electric military vehicle, comprising:

a tractive element; and an electric driveline comprising:

an electric motor; and a gearbox configured to be driven by the electric motor and drive the tractive element of the electric military vehicle, the gearbox comprising:

an input shaft configured to receive torque from the electric motor;

an output shaft configured to output torque to the tractive element;

a first planetary gear set and a second planetary gear set; and a first clutch and a second clutch, wherein the first clutch is operable to engage an element of the first planetary gear set and the second clutch is operable to engage an element of the second planetary gear set, wherein clutch pads of the first clutch are a different size than clutch pads of the second clutch; and a controller configured to:

operate the gearbox according to a park mode by controlling the first clutch to be engaged with the element of the first planetary gear set and controlling the second clutch to be engaged with the element of the second planetary gear set;

operate the gearbox according to a first driving mode by controlling the first clutch to be engaged with the element of the first planetary gear set and the second clutch to be disengaged from the element of the second planetary gear set such that the electric motor is coupled with the tractive element;

operate the second clutch to partially engage the element of the second planetary gear set such that the second clutch selectively applies braking to decelerate the electric military vehicle in the first driving mode;

operate the gearbox according to a second driving mode by controlling the first clutch to be disengaged from the element of the first planetary gear set and the second clutch to be engaged with the element of the second planetary gear set such that the electric motor is coupled with the tractive element; and operate the first clutch to partially engage the element of the first planetary gear set such that the first clutch selectively applies braking to decelerate the electric military vehicle in the first driving mode.

10. The electric military vehicle of claim 9, wherein the first planetary gear set comprises a first sun gear, a plurality of first planet gears, a first ring gear, and a first carrier, wherein the first clutch is operable to engage the first ring gear.

11. The electric military vehicle of claim 10, wherein the second planetary gear set comprises a second sun gear, a plurality of second planet gears, a second ring gear, and a second carrier, wherein the second clutch is operable to engage the second ring gear.

12. The electric military vehicle of claim 11, wherein the first carrier is coupled with the second ring gear such that rotation of the first carrier drives rotation of the second ring gear.

13. The electric military vehicle of claim 11, wherein the output shaft of the gearbox is coupled with and driven by the second carrier.

14. The electric military vehicle of claim 9, wherein the controller is configured to operate the gearbox in the park mode by operating the first clutch and the second clutch into an engaged state to engage a first ring gear of the first planetary gear set and a second ring gear of the second planetary gear set to limit rotation of the output shaft;

wherein the controller is configured to operate the gearbox in a neutral mode of operation by operating the first clutch and the second clutch to both transition into a disengaged state to allow rotation of the first ring gear and the second ring gear and allow rotation of the output shaft.

15. The electric military vehicle of claim 9, wherein the controller is configured to operate the gearbox in the first driving mode in which the first clutch is transitioned into an engaged state and the second clutch is transitioned into a disengaged state, wherein the gearbox is configured to transfer torque from the electric motor to the output shaft while operating according to the first driving mode to transport the electric military vehicle, and the controller is configured to control the second clutch to transition into a partially engaged state to provide a braking force to a ring gear of the second planetary gear set and perform a braking operation for the electric military vehicle; and wherein the controller is configured to operate the gearbox in the second driving mode in which the second clutch is transitioned into the engaged state and the first clutch is transitioned into the disengaged state, wherein the gearbox is configured to transfer torque from the electric motor to the output shaft while operating according to the second driving mode to transport the electric military vehicle, and the controller is configured to operate the first clutch to transition into a partially engaged state to provide a braking force to a ring gear of the first planetary gear set and perform a braking operation for the electric military vehicle.

16. The electric military vehicle of claim 9, wherein the controller is configured to operate the gearbox in the park mode by controlling both the first clutch and the second clutch into an engaged state such that rotation of the output shaft is limited;

wherein the controller is configured to operate the gearbox in a neutral mode by transitioning both the first clutch and the second clutch into a disengaged state such that rotation of the output shaft is de-coupled from rotation of the input shaft;

wherein the controller is configured to operate the gearbox in the first driving mode by transitioning the first clutch into the engaged state such that torque is transferred from the input shaft to the output shaft through the first planetary gear set, wherein in the first driving mode, the second clutch is configured to partially transition into the engaged state to provide braking for the electric military vehicle; and wherein the controller is configured to operate the gearbox in the second driving mode by transitioning the second clutch into the engaged state such that torque is transferred from the input shaft to the output shaft through the second planetary gear set, wherein in the second driving mode, the controller is configured to operate the first clutch to partially transition into the engaged state to provide braking for the electric military vehicle;

wherein the first planetary gear set and the second planetary gear set comprise different gear ratios such that the first driving mode is a high mode and the second driving mode is a low mode.

17. The electric military vehicle of claim 9, wherein the tractive element comprises a track.

18. A gearbox for a tracked military vehicle, the gearbox comprising:

an input shaft configured to receive input torque;

an output shaft configured to provide output torque;

a first planetary gearset and a first clutch;

a second planetary gearset and a second clutch; and a controller configured to:

operate the first clutch and the second clutch to transition between an engaged state in which the first clutch or the second clutch engage a corresponding element of the first planetary gearset or the second planetary gearset and a disengaged state in which the first clutch or the second clutch do not engage the corresponding element of the first planetary gearset and the second planetary gearset;

operate the gearbox in a park mode in which rotation of the output shaft is limited by transitioning both the first clutch and the second clutch into the engaged state;

operate the gearbox in a neutral mode in which rotation of the output shaft is not limited by transitioning both the first clutch and the second clutch into the disengaged state; and operate the gearbox in a first driving mode and a second driving mode by transitioning one of the first clutch or the second clutch into the engaged state, wherein the gearbox is configured to provide braking in the first driving mode or the second driving mode by partially engaging a disengaged one of the first clutch or the second clutch such that the disengaged one of the first clutch or the second clutch selectively applies a braking force to decelerate the tracked military vehicle.

19. The gearbox of claim 18, wherein the first planetary gearset and the second planetary gearset comprise different gear ratios such that in the first driving mode, the output shaft is driven according to higher torque and lower speed than the second driving mode.

* * * * *